United States Patent
Huang et al.

(10) Patent No.: US 10,484,065 B2
(45) Date of Patent: Nov. 19, 2019

(54) METHOD AND DEVICE FOR TRANSMITTING CHANNEL STATE INFORMATION

(71) Applicant: CHINA ACADEMY OF TELECOMMUNICATIONS TECHNOLOGY, Beijing (CN)

(72) Inventors: Qiuping Huang, Beijing (CN); Runhua Chen, Beijing (CN); Qiubin Gao, Beijing (CN); Rakesh Tamrakar, Beijing (CN); Fangchen Cheng, Beijing (CN); Xuejuan Gao, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 2 days.

(21) Appl. No.: 15/768,496

(22) PCT Filed: Aug. 29, 2016

(86) PCT No.: PCT/CN2016/097170
§ 371 (c)(1),
(2) Date: Apr. 13, 2018

(87) PCT Pub. No.: WO2017/063456
PCT Pub. Date: Apr. 20, 2017

(65) Prior Publication Data
US 2018/0302139 A1    Oct. 18, 2018

(30) Foreign Application Priority Data
Oct. 16, 2015   (CN) .......................... 2015 1 0674461

(51) Int. Cl.
H04B 7/06       (2006.01)
H04B 7/0456     (2017.01)
H04L 1/00       (2006.01)

(52) U.S. Cl.
CPC ......... H04B 7/0626 (2013.01); H04B 7/0486 (2013.01); H04B 7/063 (2013.01);
(Continued)

(58) Field of Classification Search
None
See application file for complete search history.

(56) References Cited

U.S. PATENT DOCUMENTS

2011/0243012 A1   10/2011   Luo et al.
2011/0268050 A1   11/2011   Farajidana et al.
(Continued)

FOREIGN PATENT DOCUMENTS

CN    101902263 A    12/2010
CN    102368698 A     3/2012
(Continued)

OTHER PUBLICATIONS

International Search Report for PCT/CN2016/097170 dated Nov. 25, 2016 and its English translation provided by WIPO.
(Continued)

*Primary Examiner* — Peter Chen
(74) *Attorney, Agent, or Firm* — Ladas & Parry, LLP

(57) ABSTRACT

The present disclosure provides in some embodiments a method and a device for transmitting CSI. The method for transmitting the CSI includes steps of: determining, by a UE, a first number of bits used for a joint encoding operation on a BI and a RI, the BI being configured to indicate an index of a resource for transmitting a reference signal corresponding to the RI measured by the UE, an identical first number of bits being used for the joint encoding operation on RI(s)

(Continued)

and the BI corresponding to all resources for transmitting the reference signal; and performing, by the UE, the joint encoding operation on the RI and the BI in accordance with the first number of bits to acquire encoding information, and transmitting the encoding information.

20 Claims, 8 Drawing Sheets

(52) U.S. Cl.
CPC ........... *H04B 7/066* (2013.01); *H04B 7/0639* (2013.01); *H04L 1/0026* (2013.01)

(56) References Cited

U.S. PATENT DOCUMENTS

| | | | |
|---|---|---|---|
| 2014/0369436 A1 | 12/2014 | Zhang et al. | |
| 2015/0146634 A1 | 5/2015 | Hwang et al. | |
| 2015/0280801 A1* | 10/2015 | Xin | H04B 7/0478 370/329 |
| 2016/0065289 A1* | 3/2016 | Zhao | H04L 1/0031 375/267 |
| 2016/0192297 A1* | 6/2016 | Kim | H04W 52/42 455/522 |
| 2017/0047978 A1* | 2/2017 | Kim | H04B 7/0626 |
| 2018/0262250 A1* | 9/2018 | Kim | H04B 17/309 |

FOREIGN PATENT DOCUMENTS

| | | |
|---|---|---|
| CN | 102598573 A | 7/2012 |
| CN | 103391154 A | 11/2013 |
| CN | 104184560 A | 12/2014 |
| JP | 2013531905 A | 8/2013 |
| WO | 2014171714 A1 | 10/2014 |
| WO | 2015016589 A1 | 2/2015 |
| WO | 2017043902 A1 | 3/2017 |

OTHER PUBLICATIONS

Written Opinion of the International Search Authority PCT/CN2016/097170 dated Nov. 25, 2016 and its English translation provided by Google Translate.
Catt et al. "WF on CSI reporting Class B R1-156220", 3GPPTSG-RAN1#82bis, Oct. 9, 2015 (Oct. 9, 2015), pp. 1-3.
Catt. "CSI feedback for beamformed CSI-RS on PUSCH R1-153946" 3GPP TSG RAN Wg 1 Meeting #82, Aug. 28, 2015 (Aug. 28, 2015) the whole document.
First Office Action and Search Report from CN app. No. 201510674461.1, dated Mar. 22, 2019, with English translation from Global Dossier.
Extended European Search Report from EP app. No. 16854838.6, dated May 24, 2019.
Notification of Reasons for Refusal from JP app. No. 2018519472, dated Apr. 2, 2019, with machine English translation from JPO.
Written Opinion of the International Searching Authority for PCT/CN2016/097170, dated Nov. 25, 2016 with English translation from WIPO.
International Preliminary Report on Patentability from PCT/CN2016/097170, dated Apr. 17, 2018, with English translation from WIPO.
"BI and PMI reporting for class B", 3GPP TSG RAN WG1 Meeting #82bis, Malmo, Sweden, Oct. 5-9, 2015.
"Beam selection indicator on PUSCH for CSI reporting class B", 3GPP TSG RAN WG1 Meeting #82bis, Malmö, Sweden, Oct. 5-9, 2015.
"Elevation Beamforming/Full-Dimension (FD) MIMO for LTE" Status Report to TSG, 3GPP TSG RAN Meeting #69, Phoenix, USA, Sep. 14-16, 2015.

* cited by examiner

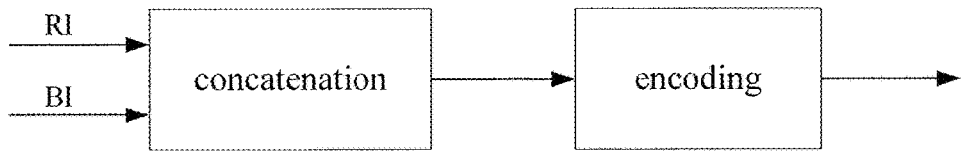

Fig. 4A

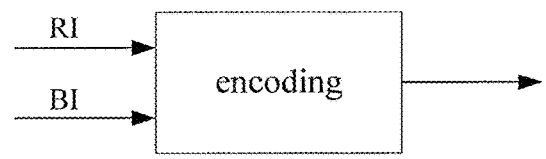

Fig. 4B

S51
determining, by a base station, a first number of bits used for a joint encoding operation on a BI and a RI, the BI being configured to indicate a serial number of a resource for transmitting a reference signal corresponding to the RI measured by a UE, an identical first number of bits being used for the joint encoding operation on the RIs corresponding to all resources for transmitting the reference signal and the BI S52
performing, by the base station, a joint decoding operation on encoding information acquired after the jointed encoding operation on the RI and the BI corresponding to the resource for transmitting the reference signal from the UE in accordance with the first number of bits, to acquire the RI corresponding to the resource for transmitting the reference signal measured by the UE

Fig.5

S61
determining, by a UE, a total number of bits for a BI and a RI for transmitting a reference signal, the BI being configured to indicate a serial number of the resource for transmitting the reference signal corresponding to the RI measured by the UE S62
performing, by the UE, a joint encoding operation on the RI and the BI in accordance with the total number of bits to acquire encoding information, and transmitting indication information indicating the total number of bits for the BI and the RI and the encoding information

Fig. 6

METHOD AND DEVICE FOR TRANSMITTING CHANNEL STATE INFORMATION

CROSS-REFERENCE TO RELATED APPLICATIONS

The present application is the U.S. national phase of PCT Application PCT/CN2016/097170 filed on Aug. 29, 2016 which claims the priority to Chinese patent application No. 201510674461.1 filed on Oct. 16, 2015, the disclosures of which are incorporated herein by reference in their entireties.

TECHNICAL FIELD

The present disclosure relates to the field of communication technology, in particular to a method and a device for transmitting channel state information (CSI).

BACKGROUND

Recently, more and more researches have been put forward on three-dimensional (3D) Multiple Input Multiple Output (MIMO) technique in the industry. An important feature of the 3D MIMO technique lies in a two-dimensional (2D) antenna structure consisting of a large number of antennae at a base station side, e.g., 8, 16, 32 or 64 antennae. FIGS. 1A to 1D show single polarization antenna structures consisting of 8, 16, 32 and 64 antennae respectively.

Currently, there is an urgent need to effectively reduce decoding complexity, power consumption and a decoding error at the base station side in the case of a 3D MIMO configuration.

SUMMARY

(1) Technical Problem to be Solved

An object of the present disclosure is to provide a method and a device for transmitting channel state information, so as to prevent the occurrence of an increase in decoding complexity, power consumption and a decoding error at an evolved NodeB (eNB) side in the case that different Channel State Information-Reference Signal (CRI-RS) resources are configured with different numbers of antenna ports.

(2) Technical Solution

In one aspect, the present disclosure provides in some embodiments a method for transmitting CSI, including steps of: determining, by a User Equipment (UE), a first number of bits used for a joint encoding operation on a Beam Indicator (BI) and a Rank Indicator (RI), the BI being configured to indicate an index of a resource for transmitting a reference signal corresponding to the RI measured by the UE, an identical first number of bits being used for the joint encoding operation on RI(s) and the BI corresponding to all resources for transmitting the reference signal; and performing, by the UE, the joint encoding operation on the RI and the BI in accordance with the first number of bits to acquire encoding information, and transmitting the encoding information.

In a possible embodiment of the present disclosure, the step of determining, by the UE, the first number of bits used for the joint encoding operation on the BI and the RI includes: determining, by the UE, numbers of bits for the RIs corresponding to all resources for transmitting the reference signal; determining, by the UE, a second number of bits for encoding the RI in accordance with a maximum value of the numbers of bits for the RIs corresponding to all resources for transmitting the reference signal; and determining, by the UE, the first number of bits in accordance with the second number of bits and a number of bits corresponding to the BI.

In a possible embodiment of the present disclosure, the step of determining, by the UE, the number of bits for the RIs corresponding to all resources for transmitting the reference signal includes: determining, by the UE, a number of bits for the RI corresponding to each resource for transmitting the reference signal in accordance with a number of antenna ports corresponding to each resource for transmitting the reference signal; or determining, by the UE, a number of bits for the RI corresponding to each resource for transmitting the reference signal in accordance with a minimum value of the number of antenna ports corresponding to each resource for transmitting the reference signal and a maximum number of layers that is supported by the UE.

In a possible embodiment of the present disclosure, the method further includes, in the case that the UE determines that the number of bits for the measured RI corresponding to the resource for transmitting the reference signal is smaller than the second number of bits, performing, by the UE, a bit padding operation on the RI corresponding to the resource for transmitting the reference signal in accordance with a predetermined bit padding rule. The step of performing, by the UE, the joint encoding operation on the RI and the BI in accordance with the first number of bits includes performing, by the UE, the joint encoding operation on the RI acquired after the bit padding operation and the BI in accordance with the first number of bits.

In a possible embodiment of the present disclosure, the step of determining, by the UE, the first number of bits used for the joint encoding operation on the BI and the RI includes: determining, by the UE, a total number of possible values of the RIs corresponding to all resources for transmitting the reference signal; and determining, by the UE, the first number of bits in accordance with the total number of the possible values of the RIs corresponding to all resources for transmitting the reference signal.

In a possible embodiment of the present disclosure, the step of determining, by the UE, the total number of the possible values of the RIs corresponding to all resources for transmitting the reference signal includes: determining, by the UE, a total number of the antenna ports corresponding to the resources for transmitting the reference signal as the total number of the possible values of the RIs corresponding to all resources for transmitting the reference signal; or determining, by the UE, a minimum value of a number of the antenna ports corresponding to each resource for transmitting the reference signal and the maximum number of layers that is supported by the UE, and determining a sum of the minimum values as the total number of the possible values of the RIs corresponding to all resources for transmitting the reference signal.

In a possible embodiment of the present disclosure, the first number of bits is determined by the UE using the following equation: $A=\lceil \log_2(\Sigma_{1\leq k\leq K} N_k)\rceil$, or $A=\lceil \log_2(\Sigma_{1\leq k\leq K} \min\{L,N_k\})\rceil$, where A represents the first number of bits, $N_k$ represents the number of antenna ports corresponding to a kth resource for transmitting the reference signal, K represents a number of resources for transmitting the reference signal, L represents the maximum layers that is supported by the UE, and $\lceil\ \rceil$ represents a rounding-up operation.

In another aspect, the present disclosure provides in some embodiments a method for receiving CSI, including steps of: determining, by a base station, a first number of bits used for a joint encoding operation on a BI and a RI, the BI being configured to indicate an index of a resource for transmitting a reference signal corresponding to the RI measured by a UE, an identical first number of bits being used for the joint encoding operation on RI(s) and the BI corresponding to all resources for transmitting the reference signal; and performing, by the base station, a joint decoding operation on encoding information from the UE in accordance with the first number of bits, to acquire the RI corresponding to the resource for transmitting the reference signal.

In a possible embodiment of the present disclosure, the step of determining, by the base station, the first number of bits used for the joint encoding operation on the BI and the RI includes: determining, by the base station, numbers of bits for the RIs corresponding to all resources for transmitting the reference signal; determining, by the base station, a second number of bits for encoding the RI in accordance with a maximum value of the numbers of bits for the RIs corresponding to all resources for transmitting the reference signal; and determining, by the base station, the first number of bits in accordance with the second number of bits and a number of bits corresponding to the BI.

In a possible embodiment of the present disclosure, the step of determining, by the base station, the numbers of bits for the RIs corresponding to all resources for transmitting the reference signal includes: determining, by the base station, a number of bits for the RI corresponding to each resource for transmitting the reference signal in accordance with a number of antenna ports corresponding to each resource for transmitting the reference signal; or determining, by the base station, a number of bits for the RI corresponding to each resource for transmitting the reference signal in accordance with a minimum value of the number of antenna ports corresponding to each resource for transmitting the reference signal and a maximum number of layers that is supported by the UE.

In a possible embodiment of the present disclosure, the step of performing, by the base station, the joint decoding operation on the encoding information from the UE in accordance with the first number of bits to acquire the RI corresponding to the resource for transmitting the reference signal includes: performing, by the base station, the joint decoding operation on the encoding information from the UE in accordance with the first number of bits, to acquire the BI and the RI; determining, by the base station, that the number of bits for the RI corresponding to the resource for transmitting the reference signal is smaller than the second number of bits; and acquiring, by the base station, the RI corresponding to the resource for transmitting the reference signal in accordance with the RI and a predetermined bit padding rule.

In a possible embodiment of the present disclosure, the step of determining, by the base station, the first number of bits used for the joint encoding operation on the BI and the RI includes: determining, by the base station, a total number of possible values of the RIs corresponding to all resources for transmitting the reference signal; and determining, by the base station, the first number of bits in accordance with the total number of the possible values of the RIs corresponding to all resources for transmitting the reference signal.

In a possible embodiment of the present disclosure, the step of determining, by the base station, the total number of the possible values of the RIs corresponding to all resources for transmitting the reference signal includes: determining, by the base station, a total number of the antenna ports corresponding to the resources for transmitting the reference signal as the total number of the possible values of the RIs corresponding to all resources for transmitting the reference signal; or determining, by the base station, a minimum value of a number of the antenna ports corresponding to each resource for transmitting the reference signal and the maximum number of layers that is supported by the UE, and determining a sum of the minimum values as the total number of the possible values of the RIs corresponding to all resources for transmitting the reference signal.

In a possible embodiment of the present disclosure, the first number of bits is determined by the base station using the following equation: $A=\lceil \log_2(\Sigma_{1 \leq k \leq K} N_k) \rceil$, or $A=\lceil \log_2(\Sigma_{1 \leq k \leq K} \min\{L, N_k\}) \rceil$, where A represents the first number of bits, $N_k$ represents the number of antenna ports corresponding to a kth resource for transmitting the reference signal, K represents a number of resources for transmitting the reference signal, L represents the maximum layers that is supported by the UE, and $\lceil \ \rceil$ represents a rounding-up operation.

In yet another aspect, the present disclosure provides in some embodiments a device for transmitting CSI, including: a determination module configured to determine a first number of bits used for a joint encoding operation on a BI and a RI, the BI being configured to indicate an index of a resource for transmitting a reference signal corresponding to the RI measured by a UE, an identical first number of bits being used for the joint encoding operation on RI(s) and the BI corresponding to all resources for transmitting the reference signal; and an encoding module configured to perform the joint encoding operation on the RI and the BI in accordance with the first number of bits to acquire encoding information, and transmit the encoding information.

In a possible embodiment of the present disclosure, the determination module is further configured to: determine numbers of bits for the RIs corresponding to all resources for transmitting the reference signal; determine a second number of bits for encoding the RI in accordance with a maximum value of the numbers of bits for the RIs corresponding to all resources for transmitting the reference signal; and determine the first number of bits in accordance with the second number of bits and a number of bits corresponding to the BI.

In a possible embodiment of the present disclosure, the determination module is further configured to: determine a number of bits for the RI corresponding to each resource for transmitting the reference signal in accordance with a number of antenna ports corresponding to each resource for transmitting the reference signal; or determine a number of bits for the RI corresponding to each resource for transmitting the reference signal in accordance with a minimum value of the number of antenna ports corresponding to each resource for transmitting the reference signal and a maximum number of layers that is supported by the UE.

In a possible embodiment of the present disclosure, the encoding module is further configured to: in the case that the number of bits for the RI corresponding to the resource for transmitting the reference signal is smaller than the second number of bits, perform a bit padding operation on the RI corresponding to the resource for transmitting the reference signal in accordance with a predetermined bit padding rule; and perform the joint encoding operation on the RI acquired after the bit padding operation and the BI in accordance with the first number of bits.

In a possible embodiment of the present disclosure, the determination module is further configured to: determine a total number of possible values of the RIs corresponding to all resources for transmitting the reference signal; and determine the first number of bits in accordance with the total number of the possible values of the RIs corresponding to all resources for transmitting the reference signal.

In a possible embodiment of the present disclosure, the determination module is further configured to: determine a total number of the antenna ports corresponding to the resources for transmitting the reference signal as the total number of the possible values of the RIs corresponding to all resources for transmitting the reference signal; or determine a minimum value of a number of the antenna ports corresponding to each resource for transmitting the reference signal and the maximum number of layers that is supported by the UE, and determine a sum of the minimum values as the total number of the possible values of the RIs corresponding to all resources for transmitting the reference signal.

In a possible embodiment of the present disclosure, the first number of bits is determined by the determination module using the following equation: $A=\lceil \log_2(\Sigma_{1 \leq k \leq K} N_k) \rceil$, or $A=\lceil \log_2(\Sigma_{1 \leq k \leq K} \min\{L,N_k\}) \rceil$, where A represents the first number of bits, $N_k$ represents the number of antenna ports corresponding to a $k^{th}$ resource for transmitting the reference signal, K represents a number of resources for transmitting the reference signal, L represents the maximum layers that is supported by the UE, and $\lceil \ \rceil$ represents a rounding-up operation.

In still yet another aspect, the present disclosure provides in some embodiments a device for receiving CSI, including: a processing module configured to determine a first number of bits used for a joint encoding operation on a BI and a RI, the BI being configured to indicate an index of a resource for transmitting a reference signal corresponding to the RI measured by a UE, an identical first number of bits being used for the joint encoding operation on RI(s) and the BI corresponding to all resources for transmitting the reference signal; and a decoding module configured to perform a joint decoding operation on encoding information from the UE in accordance with the first number of bits, to acquire the RI corresponding to the resource for transmitting the reference signal.

In a possible embodiment of the present disclosure, the processing module is further configured to: determine numbers of bits for the RIs corresponding to all resources for transmitting the reference signal; determine a second number of bits for encoding the RI in accordance with a maximum value of the numbers of bits for the RIs corresponding to all resources for transmitting the reference signal; and determine the first number of bits in accordance with the second number of bits and a number of bits corresponding to the BI.

In a possible embodiment of the present disclosure, the processing module is further configured to: determine a number of bits for the RI corresponding to each resource for transmitting the reference signal in accordance with a number of antenna ports corresponding to each resource for transmitting the reference signal; or determine a number of bits for the RI corresponding to each resource for transmitting the reference signal in accordance with a minimum value of the number of antenna ports corresponding to each resource for transmitting the reference signal and a maximum number of layers that is supported by the UE.

In a possible embodiment of the present disclosure, the decoding module is further configured to: perform the joint decoding operation on the encoding information from the UE in accordance with the first number of bits, to acquire the BI and the RI; determine that the number of bits for the RI corresponding to the resource for transmitting the reference signal is smaller than the second number of bits; and acquire the RI corresponding to the resource for transmitting the reference signal in accordance with the RI and a predetermined bit padding rule.

In a possible embodiment of the present disclosure, the processing module is further configured to: determine a total number of possible values of the RIs corresponding to all resources for transmitting the reference signal; and determine the first number of bits in accordance with the total number of the possible values of the RIs corresponding to all resources for transmitting the reference signal.

In a possible embodiment of the present disclosure, the processing module is further configured to: determine a total number of the antenna ports corresponding to the resources for transmitting the reference signal as the total number of the possible values of the RIs corresponding to all resources for transmitting the reference signal; or determine a minimum value of a number of the antenna ports corresponding to each resource for transmitting the reference signal and the maximum number of layers that is supported by the UE, and determine a sum of the minimum values as the total number of the possible values of the RIs corresponding to all resources for transmitting the reference signal.

In a possible embodiment of the present disclosure, the first number of bits is determined by the processing module using the following equation: $A=\lceil \log_2(\Sigma_{1 \leq k \leq K} N_k) \rceil$, or $A=\lceil \log_2(\Sigma_{1 \leq k \leq K} \min\{L,N_k\}) \rceil$, where A represents the first number of bits, $N_k$ represents the number of antenna ports corresponding to a kth resource for transmitting the reference signal, K represents a number of resources for transmitting the reference signal, L represents the maximum layers that is supported by the UE, and $\lceil \ \rceil$ represents a rounding-up operation.

According to the methods and devices for transmitting the CSI in the embodiments of the present disclosure, the UE determines the first number of bits used for the joint encoding operation on the BI and the RI, performs the joint encoding operation on the BI and the RI in accordance with the first number of bots, and report the encoding information. An identical first number of bits are used for the joint encoding operation on the RIs corresponding to all resources for transmitting the reference signal and the BI, so it is able for the base station to perform the joint decoding operation on the encoding information reported by the UE in accordance with the first number of bits, to acquire the RI and the BI corresponding to the resource for transmitting the reference signal. It is unnecessary for the base station to perform blind detection, so it is able to reduce the complexity in the decoding operation, the power consumption and the decoding error at the base station side.

In still yet another aspect, the present disclosure provides in some embodiments a method for transmitting CSI, including steps of: determining, by a UE, a total number of bits for a BI and a RI for transmitting a reference signal, the BI being configured to indicate an index of the resource for transmitting the reference signal corresponding to the RI measured by the UE; and performing, by the UE, a joint encoding operation on the RI and the BI in accordance with the total number of bits to acquire encoding information, and transmitting indication information indicating the total number of bits for the BI and the RI and the encoding information.

In a possible embodiment of the present disclosure, the step of determining, by the UE, the total number of bits for the BI and the RI corresponding to the resource for transmitting the reference signal includes: determining, by the UE, numbers of bits for the RIs corresponding to all resources for transmitting the reference signal, determining a second number of bits used for encoding the RI in accordance with a maximum value of the numbers of bits for the RIs corresponding to all resources for transmitting the reference signal, and determining the first number of bits in accordance with the second number of bits and a number of bit corresponding to the BI; or determining, by the UE, a total number of possible values of the RIs corresponding to all resources for transmitting the reference signal, and determining the first number of bits in accordance with the total number of the possible values of the RIs corresponding to all resources for transmitting the reference signal; or determining, by the UE, a number of bits for the RI in accordance with a minimum value of a maximum number of layers that is supported by the UE and a number of antenna ports corresponding to the resource for transmitting the reference signal, and determining the total number of bits in accordance with the number of bits for the RI and the number of bits for the BI.

In a possible embodiment of the present disclosure, the step of determining, by the UE, the number of bits for the RI corresponding to the resources for transmitting the reference signal includes: determining, by the UE, a number of bits for the RI corresponding to each resource for transmitting the reference signal in accordance with a number of antenna ports corresponding to each resource for transmitting the reference signal; or determining, by the UE, the number of bits for the RI corresponding to each resource for transmitting the reference signal in accordance with a minimum value of the number of antenna ports corresponding to each resource for transmitting the reference signal and the maximum number of layers that is supported by the UE.

In a possible embodiment of the present disclosure, the method further includes, in the case that the number of bits for the RI corresponding to the resource for transmitting the reference signal is smaller than the second number of bits, performing, by the UE, a bit padding operation on the RI corresponding to the resource for transmitting the reference signal in accordance with a predetermined bit padding rule. The step of performing, by the UE, the joint encoding operation on the RI and the BI in accordance with the first number of bits includes performing, by the UE, the joint encoding operation on the RI acquired after the bit padding operation and the BI in accordance with the first number of bits.

In a possible embodiment of the present disclosure, the step of determining, by the UE, the total number of the possible values of the RIs corresponding to all resources for transmitting the reference signal includes: determining, by the UE, a total number of antenna ports corresponding to the resources for transmitting the reference signal as the total number of the possible values of the RIs corresponding to all resources for transmitting the reference signal; or determining, by the UE, a minimum value of the number of antenna ports corresponding to each resource for transmitting the reference signal and the maximum number of layers that is supported by the UE, and determining a sum of the minimum values as the total number of the possible values of the RIs corresponding to all resources for transmitting the reference signal.

In a possible embodiment of the present disclosure, the first number of bits is determined by the UE using the following equation: $A = \lceil \log_2(\Sigma_{1 \leq k \leq K} N_k) \rceil$, or $A = \lceil \log_2(\Sigma_{1 \leq k \leq K} \min\{L, N_k\}) \rceil$, where A represents the first number of bits, $N_k$ represents the number of antenna ports corresponding to a kth resource for transmitting the reference signal, K represents a number of resources for transmitting the reference signal, L represents the maximum layers that is supported by the UE, and $\lceil \ \rceil$ represents a rounding-up operation.

In a possible embodiment of the present disclosure, a number of bits for the indication information is $\lceil \log_2(K) \rceil$, where K represents a number of resources for transmitting the reference signal, and $\lceil \ \rceil$ represents a rounding-up operation; or the number of bits for the indication information is $\lceil \log_2(S) \rceil$, where $S = \text{unique}(N_k, 1 \leq k \leq K)$ and S represents a total number of values in numbers of the antenna ports corresponding to the resources for transmitting the reference signal, and $N_k$ represents a number of the antenna ports corresponding to a $k^{th}$ resource for transmitting the reference signal; or the number of bits for the indication information is $\lceil \log_2(B) \rceil$, $B = \text{unique}(\log_2[N_k], 1 \leq k \leq K)$ and B represents a total number of values in numbers of bits corresponding to the numbers of antenna ports corresponding to the resources for transmitting the reference signal, and $N_k$ represents a number of the antenna ports corresponding to the $k^{th}$ resource for transmitting the reference signal; or the number of bits for the indication information is $\lceil \log_2(P) \rceil$, where $P = \text{unique}(\min\{N_k, L\}, 1 \leq k \leq K)$ and P represents a total number of values in the numbers of antenna ports corresponding to the resources for transmitting the reference signal and not greater than the maximum number of layers that is supported by the UE, L represents the maximum number of layers that is supported by the UE, and $N_k$ represents a number of the antenna ports corresponding to the $k^{th}$ resource for transmitting the reference signal; or the number of bits for the indication information is $\lceil \log_2(Y) \rceil$, where $Y = \text{unique}(\lceil \log_2 \min\{N_k, L\} \rceil, 1 \leq k \leq K)$ and Y represents a total number of different values in the numbers of bits, wherein the numbers of bits correspond to the number of antenna ports that correspond to the resources for transmitting the reference signal and not greater than the maximum number of layers that is supported by the UE, L represents the maximum number of layers that is supported by the UE, and $N_k$ represents a number of the antenna ports corresponding to the $k^{th}$ resource for transmitting the reference signal.

In a possible embodiment of the present disclosure, the step of transmitting, by the UE, the indication information indicating the total number of bits for the RI and the BI and the encoding information includes: transmitting, by the UE, the indication information within a first subframe, and transmitting the encoding information within a second subframe subsequent to the first subframe; or transmitting, by the UE, the indication information and the encoding information within an identical subframe using an independent encoding mode.

In a possible embodiment of the present disclosure, the step of transmitting, by the UE, the indication information indicating the total number of bits for the RI and the BI and the encoding information includes: transmitting, by the UE, the indication information and the encoding information via a Physical Uplink Control Channel (PUCCH); or transmitting, by the UE, the indication information and the encoding information via a Physical Uplink Shared Channel (PUCCH) within different subframes respectively; transmitting, by the UE, the indication information via the PUCCH, and transmitting the encoding information via the PUSCH; or transmitting, by the UE, the indication information via the PUSCH, and transmitting the encoding information via the PUCCH.

In still yet another aspect, the present disclosure provides in some embodiments a method for receiving CSI, including steps of: receiving, by a base station, indication information indicating a total number of bits for a BI and a RI corresponding to a resource for transmitting a reference signal and encoding information, the BI being configured to indicate an index of the resource for transmitting the reference signal corresponding to the RI measured by a UE; performing, by the base station, a joint decoding operation on the encoding information in accordance with the total number of bits indicated in the indication information, to acquire the RI and the BI.

In a possible embodiment of the present disclosure, a number of bits for the indication information is $\lceil \log_2(K) \rceil$, where K represents a number of resources for transmitting the reference signal, and $\lceil\ \rceil$ represents a rounding-up operation; or the number of bits for the indication information is $\lceil \log_2(S) \rceil$, where S=unique($N_k$, 1≤k≤K) and S represents a total number of values in numbers of antenna ports corresponding to the resources for transmitting the reference signal, and $N_k$ represents a number of the antenna ports corresponding to a $k^{th}$ resource for transmitting the reference signal; or the number of bits for the indication information is $\lceil \log_2(B) \rceil$, where B=unique($\log_2\lceil N_k \rceil$, 1≤k≤K) and B represents a total number of values in numbers of bits corresponding to the numbers of antenna ports corresponding to the resources for transmitting the reference signal, and $N_k$ represents a number of the antenna ports corresponding to the $k^{th}$ resource for transmitting the reference signal; or the number of bits for the indication information is $\lceil \log_2(P) \rceil$, where P=unique(min{$N_k$,L}, 1≤k≤K) and P represents a total number of values in the numbers of antenna ports corresponding to the resources for transmitting the reference signal and not greater than a maximum number of layers that is supported by the UE, L represents the maximum number of layers that is supported by the UE, and $N_k$ represents a number of the antenna ports corresponding to the $k^{th}$ resource for transmitting the reference signal; or the number of bits for the indication information is $\lceil \log_2(Y) \rceil$, where Y=unique($\lceil \log_2 \min\{N_k L\} \rceil$, 1≤k≤K) and Y represents a total number of different values in the numbers of bits, wherein the numbers of bits correspond to the number of antenna ports that correspond to the resources for transmitting the reference signal and not greater than the maximum number of layers that is supported by the UE, L represents the maximum number of layers that is supported by the UE, and $N_k$ represents a number of the antenna ports corresponding to the $k^{th}$ resource for transmitting the reference signal.

In a possible embodiment of the present disclosure, the step of performing, by the base station, the joint decoding operation on the encoding information in accordance with the total number of bits indicated in the indication information to acquire the RI and the BI includes: performing, by the base station, the joint decoding operation on the encoding information from the UE in accordance with the total number of bits indicated in the indication information to acquire the BI and RI; determining, by the base station, that a number of bits for the RI corresponding to the resource for transmitting the reference signal measured by the UE is smaller than a number of bits used for encoding the RI in accordance with the BI; and determining, by the base station, the RI corresponding to the resource for transmitting the reference signal measured by the UE in accordance with the RI and a predetermined bit padding rule.

In a possible embodiment of the present disclosure, the step of receiving, by the base station, the indication information indicating the total number of bits for the BI and the RI corresponding to the resource for transmitting the reference signal and the encoding information includes: receiving, by the base station, the indication information within a first subframe, and receiving the encoding information within a second subframe subsequent to the first subframe; or receiving, by the base station, the indication information and the encoding information within an identical subframe, the indication information and the encoding information being encoded using an independent encoding mode.

In a possible embodiment of the present disclosure, the step of receiving, by the base station, the indication information indicating the total number of bits for the BI and the RI corresponding to the resource for transmitting the reference signal and the encoding information includes: receiving, by the base station, the indication information and the encoding information via a PUCCH; or receiving, by the base station, the indication information and the encoding information via PUSCHs within different subframes respectively; or receiving, by the base station, the indication information via the PUCCH, and receiving the encoding information via the PUSCH; or receiving, by the base station, the indication information via the PUSCH, and receiving the encoding information via the PUCCH.

In still yet another aspect, the present disclosure provides in some embodiments a device for transmitting CSI, including: a determination module configured to determine a total number of bits for a BI and a RI for transmitting a reference signal, the BI being configured to indicate an index of the resource for transmitting the reference signal corresponding to the RI measured by a UE; an encoding module configured to perform a joint encoding operation on the RI and the BI in accordance with the total number of bits to acquire encoding information; and a transmission module configured to transmit indication information indicating the total number of bits for the BI and the RI and the encoding information.

In a possible embodiment of the present disclosure, the determination module is further configured to: determine numbers of bits for the RIs corresponding to all resources for transmitting the reference signal, determine a second number of bits used for encoding the RI in accordance with a maximum value of the numbers of bits for the RIs corresponding to all resources for transmitting the reference signal, and determine the first number of bits in accordance with the second number of bits and a number of bit corresponding to the BI; or determine a total number of possible values of the RIs corresponding to all resources for transmitting the reference signal, and determine the first number of bits in accordance with the total number of the possible values of the RIs corresponding to all resources for transmitting the reference signal; or determine a number of bits for the RI in accordance with a minimum value of a maximum number of layers that is supported by the UE and a number of antenna ports corresponding to the resource for transmitting the reference signal, and determine the total number of bits in accordance with the number of bits for the RI and the number of bits for the BI.

In a possible embodiment of the present disclosure, the determination module is further configured to: determine a number of bits for the RI corresponding to each resource for transmitting the reference signal in accordance with a number of antenna ports corresponding to each resource for transmitting the reference signal; or determine the number of bits for the RI corresponding to each resource for transmitting the reference signal in accordance with a minimum value of the number of antenna ports corresponding to each resource for transmitting the reference signal and the maximum number of layers that is supported by the UE.

In a possible embodiment of the present disclosure, the encoding module is further configured to: in the case that the number of bits for the RI corresponding to the resource for transmitting the reference signal is smaller than the second number of bits, perform a bit padding operation on the RI corresponding to the resource for transmitting the reference signal in accordance with a predetermined bit padding rule; and perform the joint encoding operation on the RI acquired after the bit padding operation and the BI in accordance with the first number of bits.

In a possible embodiment of the present disclosure, the determination module is further configured to: determine a total number of antenna ports corresponding to the resources for transmitting the reference signal as the total number of the possible values of the RIs corresponding to all resources for transmitting the reference signal; or determine a minimum value of the number of antenna ports corresponding to each resource for transmitting the reference signal and the maximum number of layers that is supported by the UE, and determine a sum of the minimum values as the total number of the possible values of the RIs corresponding to all resources for transmitting the reference signal.

In a possible embodiment of the present disclosure, the first number of bits is determined by the determination module using the following equation: $A = \lceil \log_2(\Sigma_{1 \leq k \leq K} N_k) \rceil$, or $A = \lceil \log_2(\Sigma_{1 \leq k \leq K} \min\{L, N_k\}) \rceil$, where A represents the first number of bits, $N_k$ represents the number of antenna ports corresponding to a kth resource for transmitting the reference signal, K represents a number of resources for transmitting the reference signal, L represents the maximum layers that is supported by the UE, and $\lceil \ \rceil$ represents a rounding-up operation.

In a possible embodiment of the present disclosure, a number of bits for the indication information is $\lceil \log_2(K) \rceil$, where K represents a number of resources for transmitting the reference signal, and $\lceil \ \rceil$ represents a rounding-up operation; or the number of bits for the indication information is $\lceil \log_2(S) \rceil$, where $S = \text{unique}(N_k, 1 \leq k \leq K)$ and S represents a total number of values in numbers of the antenna ports corresponding to the resources for transmitting the reference signal, and $N_k$ represents a number of the antenna ports corresponding to a $k^{th}$ resource for transmitting the reference signal; or the number of bits for the indication information is $\lceil \log_2(B) \rceil$, where and $B = \text{unique}(\log_2 \lceil N_k \rceil, 1 \leq k \leq K)$ and B represents a total number of values in numbers of bits corresponding to the numbers of antenna ports corresponding to the resources for transmitting the reference signal, and $N_k$ represents a number of the antenna ports corresponding to the $k^{th}$ resource for transmitting the reference signal; or the number of bits for the indication information is $\lceil \log_2(P) \rceil$, where and $P = \text{unique}(\log_2 \lceil N_k \rceil, 1 \leq k \leq K)$ and P represents a total number of values in the numbers of antenna ports corresponding to the resources for transmitting the reference signal and not greater than the maximum number of layers that is supported by the UE, L represents the maximum number of layers that is supported by the UE, and $N_k$ represents a number of the antenna ports corresponding to the $k^{th}$ resource for transmitting the reference signal; or the number of bits for the indication information is $\lceil \log_2(Y) \rceil$, where $Y = \text{unique}(\lceil \log_2 \min\{N_k, L\} \rceil, 1 \leq k \leq K)$ and Y represents a total number of different values in the numbers of bits, wherein the numbers of bits correspond to the number of antenna ports that correspond to the resources for transmitting the reference signal and not greater than the maximum number of layers that is supported by the UE, L represents the maximum number of layers that is supported by the UE, and $N_k$ represents a number of the antenna ports corresponding to the $k^{th}$ resource for transmitting the reference signal.

In a possible embodiment of the present disclosure, the transmission module is further configured to: transmit the indication information within a first subframe, and transmit the encoding information within a second subframe subsequent to the first subframe; or transmit the indication information and the encoding information within an identical subframe using an independent encoding mode.

In a possible embodiment of the present disclosure, the transmission module is further configured to: transmit the indication information and the encoding information via a PUCCH; or transmit the indication information and the encoding information via a PUCCH within different subframes respectively; transmit the indication information via the PUCCH, and transmit the encoding information via the PUSCH; or transmit the indication information via the PUSCH, and transmit the encoding information via the PUCCH.

In still yet another aspect, the present disclosure provides in some embodiments a device for receiving CSI, including: a reception module configured to receive indication information indicating a total number of bits for a BI and a RI corresponding to a resource for transmitting a reference signal and encoding information, the BI being configured to indicate an index of the resource for transmitting the reference signal corresponding to the RI measured by a UE; a decoding module configured to perform a joint decoding operation on the encoding information in accordance with the total number of bits indicated in the indication information, to acquire the RI and the BI.

In a possible embodiment of the present disclosure, the decoding module is further configured to: perform the joint decoding operation on the encoding information from the UE in accordance with the total number of bits indicated in the indication information to acquire the BI and RI; determine that a number of bits for the RI corresponding to the resource for transmitting the reference signal measured by the UE is smaller than a number of bits used for encoding the RI in accordance with the BI; and determine the RI corresponding to the resource for transmitting the reference signal measured by the UE in accordance with the RI and a predetermined bit padding rule.

In a possible embodiment of the present disclosure, the reception module is further configured to: receive the indication information within a first subframe, and receive the encoding information within a second subframe subsequent to the first subframe; or receive the indication information and the encoding information within an identical subframe, the indication information and the encoding information being encoded using an independent encoding mode.

In a possible embodiment of the present disclosure, the reception module is further configured to: receive the indication information and the encoding information via a PUCCH; or receive the indication information and the encoding information via PUSCHs within different subframes respectively; or receive the indication information via the PUCCH, and receive the encoding information via the PUSCH; or receive the indication information via the PUSCH, and receive the encoding information via the PUCCH.

According to the methods and devices for transmitting the CSI in the embodiments of the present disclosure, the UE transmits the indication information indicating the total number of bits for the BI and the RI for transmitting the reference signal and the encoding information, so that the base station determines the total number of bits for the BI and the RI for transmitting the reference signal in accordance with the indication information. As a result, it is able for the base station to perform the joint decoding operation on the encoding information from the UE in accordance with the total number of bits, thereby to acquire the RI corresponding to the resource for transmitting the reference signal and the BI indicating the index of the resource for transmitting the reference signal. It is unnecessary for the base station to perform blind detection, so it is able to reduce the complexity in the decoding operation, the power consumption and the decoding error at the base station side.

In still yet another aspect, the present disclosure provides in some embodiments a method for transmitting CSI, including steps of: determining, by a UE, numbers of antenna ports corresponding to resources for transmitting a reference signal configured by a base station for the UE in a CSI progress for channel measurement; and performing, by the UE, measurement on a pre-designated resource for transmitting the reference signal, and transmitting the CSI acquired after the measurement.

In a possible embodiment of the present disclosure, the method further includes transmitting, by the UE, a BI indicating an index of the resource for transmitting the reference signal measured by the UE.

In a possible embodiment of the present disclosure, the step of transmitting, by the UE, the BI and the CSI includes: transmitting, by the UE, the BI within a first subframe, and transmitting the CSI within a second subframe subsequent to the first subframe; or transmitting, by the UE, the BI and the CSI within an identical subframe, the BI and the CSI being encoded using an independent encoding mode.

In a possible embodiment of the present disclosure, the step of transmitting, by the UE, the BI and the CSI includes: transmitting, by the UE, the BI and the CSI via a PUCCH; or transmitting, by the UE, the BI and the CSI via PUSCHs within different subframes respectively; or transmitting, by the UE, the BI via the PUCCH, and transmitting the CSI via the PUSCH; or transmitting, by the UE, the CSI via the PUSCH, and transmitting the BI via the PUCCH.

In still yet another aspect, the present disclosure provides in some embodiments a method for receiving CSI, including steps of: determining, by a base station, numbers of antenna ports corresponding to resources for transmitting a reference signal configured by the base station for a UE in a CSI progress for channel measurement; and determining, by the base station, a number of bits for a RI corresponding to a pre-designated resource for transmitting the reference signal, and performing a decoding operation on the CSI from the UE in accordance with the number of bits for the RI, to acquire the CSI measured by the UE.

In a possible embodiment of the present disclosure, the method further includes receiving, by the base station, a BI indicating an index of the resource for transmitting the reference signal from the UE.

In a possible embodiment of the present disclosure, the step of receiving, by the base station, the BI and the CSI includes: receiving, by the base station, the BI within a first subframe, and receiving the CSI within a second subframe subsequent to the first substrate; or receiving, by the base station, the BI and the CSI within an identical subframe, the BI and the CSI being encoded using an independent encoding mode.

In a possible embodiment of the present disclosure, the step of receiving, by the base station, the BI and the CSI includes: receiving, by the base station, the BI and the CSI via a PUCCH; or receiving, by the base station, the BI and the CSI via PUSCHs within different subframes respectively; or receiving, by the base station, the BI via the PUCCH, and receiving the CSI via the PUSCH; or receiving, by the base station, the CSI via the PUSCH, and receiving the BI via the PUCCH.

In still yet another aspect, the present disclosure provides in some embodiments a device for transmitting CSI, including: a determination module configured to determine numbers of antenna ports corresponding to resources for transmitting a reference signal configured by a base station for a UE in a CSI progress for channel measurement; a measurement module configured to perform measurement on a pre-designated resource for transmitting the reference signal; and a transmission module configured to transmit the CSI acquired after the measurement.

In a possible embodiment of the present disclosure, the transmission module is further configured to transmit a BI indicating an index of the resource for transmitting the reference signal measured by the UE.

In a possible embodiment of the present disclosure, the transmission module is further configured to transmit the BI within a first subframe, and transmit the CSI within a second subframe subsequent to the first subframe; or transmit the BI and the CSI within an identical subframe, the BI and the CSI being encoded using an independent encoding mode.

In a possible embodiment of the present disclosure, the transmission module is further configured to: transmit the BI and the CSI via a PUCCH; or transmit the BI and the CSI via PUSCHs within different subframes respectively; or transmit the BI via the PUCCH, and transmit the CSI via the PUSCH; or transmit the CSI via the PUSCH, and transmit the BI via the PUCCH.

In still yet another aspect, the present disclosure provides in some embodiments a device for receiving CSI, including: a reception module configured to receive the CI from a UE; a determination module configured to determine numbers of antenna ports corresponding to resources for transmitting a reference signal configured by the base station for a UE in a CSI progress for channel measurement; and a decoding module configured to determine a number of bits for a RI corresponding to a pre-designated resource for transmitting the reference signal, and perform a decoding operation on the CSI from the UE in accordance with the number of bits for the RI, to acquire the CSI measured by the UE.

In a possible embodiment of the present disclosure, the reception module is further configured to receive a BI indicating an index of the resource for transmitting the reference signal from the UE.

In a possible embodiment of the present disclosure, the reception module is further configured to: receive the BI within a first subframe, and receive the CSI within a second subframe subsequent to the first substrate; or receive the BI and the CSI within an identical subframe, the BI and the CSI being encoded using an independent encoding mode.

In a possible embodiment of the present disclosure, the reception module is further configured to: receive the BI and the CSI via a PUCCH; or receive the BI and the CSI via PUSCHs within different subframes respectively; or receive the BI via the PUCCH, and receive the CSI via the PUSCH; or receive the CSI via the PUSCH, and receive the BI via the PUCCH.

According to the methods and devices in the embodiments of the present disclosure, the UE measures the pre-designated resources for transmitting the reference signal, and transmits the CSI acquired after the measurement. The resource for transmitting the reference signal measured by the UE is known to the base station in advance, so the base station may determine the number of bits for the RI corresponding to the resource for transmitting the reference signal measured by the UE. As a result, it is able for the base station to decode the CSI from the UE in accordance with the number of bits corresponding to the RI, to acquire the RI measured by the UE.

In still yet another aspect, the present disclosure provides in some embodiments a method for transmitting CSI, including steps of: determining, by a UE, numbers of antenna ports corresponding to resources for transmitting a reference signal configured by a base station for the UE in a CSI progress for channel measurement; and transmitting, by the UE, the CSI corresponding to the resources for transmitting the reference signal in accordance with a predetermined reporting sequence.

In a possible embodiment of the present disclosure, the method further includes transmitting, by the UE, a BI indicating an index of the resource for transmitting the reference signal measured by the UE.

In a possible embodiment of the present disclosure, the step of transmitting, by the UE, the BI and the CSI includes: transmitting, by the UE, the BI within a first subframe, and transmitting the CSI within a second subframe subsequent to the first subframe; or transmitting, by the UE, the BI and the CSI within an identical subframe, the BI and the CSI being encoded using an independent encoding mode.

In a possible embodiment of the present disclosure, the step of transmitting, by the UE, the BI and the CSI includes: transmitting, by the UE, the BI and the CSI via a PUCCH; or transmitting, by the UE, the BI and the CSI via PUSCHs within different subframes respectively; or transmitting, by the UE, the BI via the PUCCH, and transmitting the CSI via the PUSCH; or transmitting, by the UE, the CSI via the PUSCH, and transmitting the BI via the PUCCH.

In still yet another aspect, the present disclosure provides in some embodiments a method for receiving CSI, including steps of: determining, by a base station, numbers of antenna ports corresponding to resources for transmitting a reference signal configured by the base station for a UE in a CSI progress for channel measurement; and determining, by the base station, a number of bits for a RI corresponding to each resource for transmitting the reference signal in accordance with a predetermined reporting sequence, and performing a decoding operation on the CSI corresponding to the resource for transmitting the reference signal in accordance with the number of bits for the RI.

In a possible embodiment of the present disclosure, the method further includes receiving, by the base station, a BI indicating an index of the resource for transmitting the reference signal measured by the UE from the UE.

In a possible embodiment of the present disclosure, the step of receiving, by the base station, the BI and the CSI includes: receiving, by the base station, the BI within a first subframe, and receiving the CSI within a second subframe subsequent to the first subframe; or receiving the BI and the CSI within an identical subframe, the BI and the CSI being encoded using an independent encoding mode.

In a possible embodiment of the present disclosure, the step of receiving, by the base station, the BI and the CSI includes: receiving, by the base station, the BI and the CSI via a PUCCH; or receiving, by the base station, the BI and the CSI via PUSCHs within different subframes respectively; or receiving, by the base station, the BI via the PUCCH, and receiving the CSI via the PUSCH; or receiving, by the base station, the BI via the PUSCH, and receiving the SCI via the PUCCH.

In still yet another aspect, the present disclosure provides in some embodiments a device for transmitting CSI, including: a determination module configured to determine numbers of antenna ports corresponding to resources for transmitting a reference signal configured by a base station for a UE in a CSI progress for channel measurement; and a transmission module configured to transmit the CSI corresponding to the resources for transmitting the reference signal in accordance with a predetermined reporting sequence.

In a possible embodiment of the present disclosure, the transmission module is further configured to transmit a BI indicating an index of the resource for transmitting the reference signal measured by the UE.

In a possible embodiment of the present disclosure, the transmission module is further configured to: transmit the BI within a first subframe, and transmitting the CSI within a second subframe subsequent to the first subframe; or transmit the BI and the CSI within an identical subframe, the BI and the CSI being encoded using an independent encoding mode.

In a possible embodiment of the present disclosure, the transmission module is further configured to: transmit the BI and the CSI via a PUCCH; or transmit the BI and the CSI via PUSCHs within different subframes respectively; or transmit the BI via the PUCCH, and transmit the CSI via the PUSCH; or transmit the CSI via the PUSCH, and transmit the BI via the PUCCH.

In still yet another aspect, the present disclosure provides in some embodiments a device for receiving CSI, including: a reception module configured to receive the CSI measured by a UE in accordance with resources for transmitting a reference signal; a determination module configured to determine numbers of antenna ports corresponding to resources for transmitting a reference signal configured for the UE in a CSI progress for channel measurement; and a decoding module configured to determine a number of bits for a RI corresponding to each resource for transmitting the reference signal in accordance with a predetermined reporting sequence, and perform a decoding operation on the CSI corresponding to the resource for transmitting the reference signal in accordance with the number of bits for the RI.

In a possible embodiment of the present disclosure, the reception module is further configured to receive a BI indicating an index of the resource for transmitting the reference signal measured by the UE from the UE.

In a possible embodiment of the present disclosure, the reception module is further configured to receive the BI within a first subframe, and receive the CSI within a second subframe subsequent to the first subframe; or receive the BI and the CSI within an identical subframe, the BI and the CSI being encoded using an independent encoding mode.

In a possible embodiment of the present disclosure, the reception module is further configured to: receive the BI and the CSI via a PUCCH; or receive the BI and the CSI via PUSCHs within different subframes respectively; or receive the BI via the PUCCH, and receive the CSI via the PUSCH; or receive the BI via the PUSCH, and receive the SCI via the PUCCH.

According to the methods and devices for transmitting the CSI in the embodiments of the present disclosure, the UE transmits the CSI acquired after measuring the resources for transmitting the reference signals in accordance with the predetermined reporting sequence. The reporting sequence is known to the base station, so the base station may determine the number of bits for the RI transmitted by the UE each time. As a result, it is able for the base station to decode the CSI from the UE in accordance with the number of bits for the RI, thereby to acquire the RI measured by the UE.

(3) Beneficial Effect

According to the methods and devices for transmitting the CSI in the embodiments of the present disclosure, it is able to at least partially prevent the occurrence of an increase in the decoding complexity, the power consumption and the decoding error at an eNB side in the case that different CRI-RS resources are configured with different numbers of antenna ports.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

FIG. 4A is a schematic view showing a first joint encoding mode according to one embodiment of the present disclosure;

FIG. 4B is a schematic view showing a second joint encoding mode according to one embodiment of the present disclosure;

FIG. 5 is a flow chart of a method for receiving CSI according to one embodiment of the present disclosure;

FIG. 6 is a flow chart of a method for transmitting CSI according to one embodiment of the present disclosure;

DETAILED DESCRIPTION OF THE EMBODIMENTS

The present disclosure will be described hereinafter in conjunction with the drawings and embodiments. The following embodiments are for illustrative purposes only, but shall not be used to limit the scope of the present disclosure.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Figure 3:
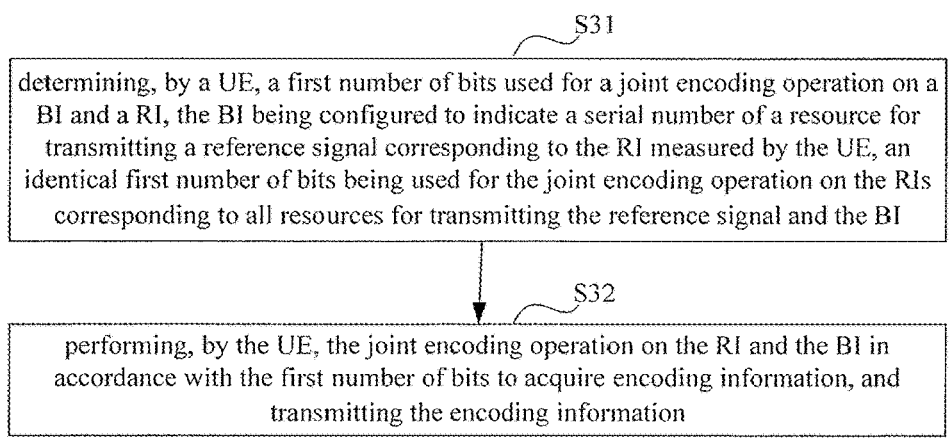
FIG. 3 is a flow chart of a method for transmitting CSI according to one embodiment of the present disclosure.

The present disclosure provides in some embodiments a method for transmitting CSI which, as shown in FIG. 3, includes: Step S31 of determining, by a UE, a first number of bits used for a joint encoding operation on a BI and a RI, the BI being configured to indicate an index of a resource for transmitting a reference signal corresponding to the RI measured by the UE, an identical first number of bits being used for the joint encoding operation on RI(s) and the BI corresponding to all resources for transmitting the reference signal; and Step S32 of performing, by the UE, the joint encoding operation on the RI and the BI in accordance with the first number of bits to acquire encoding information, and transmitting the encoding information.

According to the method in the embodiments of the present disclosure, the UE determines the first number of bits used for the joint encoding operation on the BI and the RI, performs the joint encoding operation on the BI and the RI in accordance with the first number of bots, and reports the encoding information. An identical first number of bits are used for the joint encoding operation on the RIs corresponding to all resources for transmitting the reference signal and the BI, so it is able for the base station to perform the joint decoding operation on the encoding information reported by the UE in accordance with the first number of bits, to acquire the RI and the BI corresponding to the resource for transmitting the reference signal. It is unnecessary for the base station to perform blind detection, so it is able to reduce the complexity in the decoding operation, the power consumption and the decoding error at the base station side.

It should be appreciated that, the number of bits (e.g., a first number of bits, a second number of bits or a total number of bits) in the embodiments of the present disclosure may also be called as payload. For example, the first number of bits may be called as a first payload, the second number of bits may be called as a second payload, and the total number of bits may be called as a total payload.

Figure 1A:
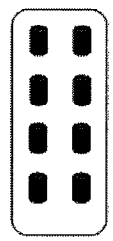
FIGS. 1A to 1D are schematic view showing a 2D antenna structure.
Figure 1B:
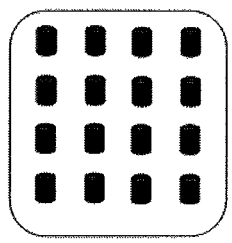
Figure 1C:
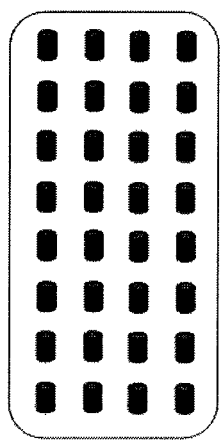
Figure 1D:
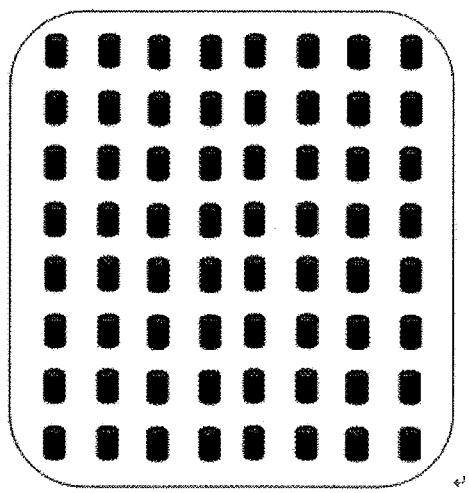
Figure 2:
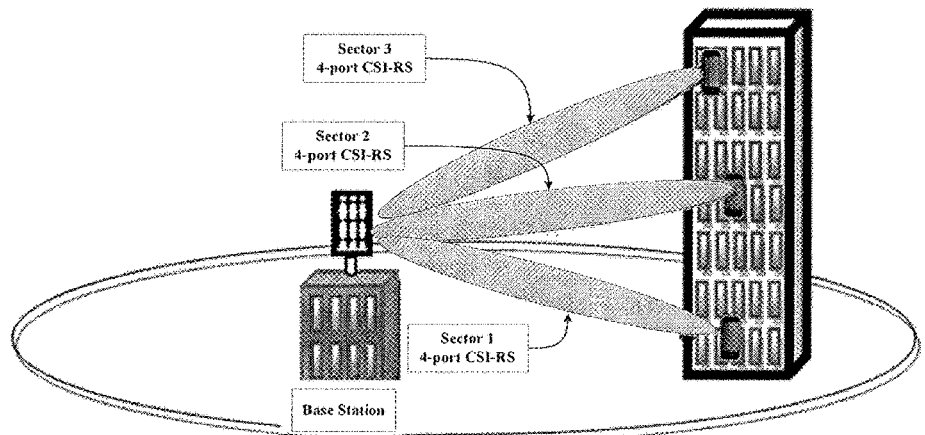
FIG. 2 is a schematic view showing a sector in a vertical dimension.

In a 3D MIMO system for a 2D antenna structure, it is able to perform beamforming operation in both a horizontal direction and a vertical direction. A typical application scenario includes sectorization in a vertical dimension, as shown in FIG. 2. In FIG. 2, 16 antennae of a base station are virtualized into four antenna ports, i.e., every four antennae in the vertical dimension are virtualized into one antenna port. The base station is divided into three sectors in the vertical dimension, to cover a building. Each sector is configured with 4-port CSI-RS resources, so totally three 4-port CSI-RS resources are required. A UE is configured with a CSI process for channel feedback, so CSI feedback from the UE in the sector to which it belongs includes at least one of RI, Precoding Matrix Indicator (PMI) and Channel Quality Indicator (CQI). The RI represents the number of data layers that is received by the UE in an existing channel state. As an index, the PMI is directed to a certain precoding matrix in a fixed codebook, and it represents the precoding matrix to be used by an eNB for the downlink transmission as recommended by the UE. The CQI represents a strength of a downlink signal in the case that the eNB performs the beamforming operation using the RI/PMI fed back from the UE. In the case that the UE is configured with multiple CSI progresses (e.g., three CSI progresses) for the feedback, the UE may feed back multiple (e.g. 3) CSIs. Similarly, in the case that the base station is configured with 8 (or more) antenna ports, the base station is required to transmit three 8-port CSI-RS resources in the case that it is divided into three sectors in the vertical dimension.

Taking a Long Term Evolution (LTE) system as an example, the CSI feedback may be performed as follows.

The UE is configured with a CSI progress by the eNB. This CSI progress corresponds to K CSI-RS resources, and a $k^{th}$ resource is provided with Nk antenna ports, where 1≤k≤K, and K is an integer greater than or equal to 1. The eNB may perform the beamforming operation on different CSI-RS resources using different beamforming matrices. For example, the eNB may perform the beamforming operation on a first CSI-RS resource using a first beamforming matrix V1, perform the beamforming operation on a second CSI-RS resource using a second beamforming matrix V2, and perform the beamforming operation on a third CSI-RS resource using a third beamforming matrix V3.

Next, the UE performs channel measurement on the K CSI-RS resources, to select an optimum CSI-RS resource. For example, the UE may measure three (K=3) CSI-RS resources, to select the optimum CSI-RS resource (e.g., select the CSI-RS resource with the largest reference symbol received power, or the CSI-RS resource with the largest CQI, or the CSI-RS resource with the largest data rate). Next, the UE feeds back an index of the selected optimum CSI-RS resource through a BI, and the BI is used to indicate the index of the CSI-RS resource corresponding to the CSI feedback. The UE performs the measurement on the selected optimum CSI-RS resource, and feeds back the CSI, and the CSI includes the RI and the CQI/PMI.

Next, the eNB receives the BI and the CSI reported by the UE, determines the optimum CSI-RS resource in accordance with the received BI, and decodes the CSI feedback. In a possible embodiment of the present disclosure, the eNB may transmit downlink data in accordance with the CSI feedback acquired after the decoding operation.

In a current protocol, each CSI progress corresponds to one CSI-RS resource, and one RI and one CQI/PMI are fed back in one CSI progress. A number of bits for the RI (also called a payload for the RI) is determined in accordance with a maximum number of layers capable of being received by the UE (also called as a maximum number of layers that is supported by the UE) and a number of CSI-RS ports, and the CSI-RS resource is configured by the eNB for the UE. For example, in the case that the UE is capable of receiving two layers of data and configured with a 4-port CSI-RS resource, the number of bits for the RI may be $\log_2(\min(2,4))=1$, and a feedback value of the RI may be 1 or 2. For another example, in the case that the UE is capable of receiving four layers of data, the number of bits for the RI may be 2, and a feedback value of the RI may be 1, 2, 3 or 4. The payload of the RI is known to the eNB and the UE, so the eNB may directly decode the CSI feedback.

For the CSI-RS configured in a beamforming mode, one CSI progress is configured with K CSI-RS resources (K≥1), and the $k^{th}$ CSI-RS resource includes $N_k$ ports. In the case that K>1, the K CSI-RS resources may correspond to the ports in different amounts. For example, $N_k$ may be a value in {1,2,4,8}, or a larger value, e.g., 12 or 16. The RI fed back in the CSI based on the BI may have different numbers of bits. Without loss of generality, a CSI progress corresponding K (K=2) CSI-RS resources, where N1=2, and N2=4, will be described below as an example. In the case that BI=1 and the RI is reported on the basis of the first CSI-RS resource, the number of bits for the RI may be 1. In the case that BI=2 and the RI is reported on the basis of the second CSI-RS resource, the number of bits for the RI may be 2. In the case that the BI and the RI are jointly encoded, they must be jointly decoded. However, different CSI-RS resources may not be definitely provided with an identical number of antenna ports, so the numbers of bits for the RIs may be different too. In this case, the eNB may merely perform blind detection in accordance with a possible total number of bits for the BI/RI. In the case that the eNB does not know a value of the BI before decoding the BI/RI, it may not know the number of bits for the RI, so it may not know the total number of bits for the BI and the RI. In this case, the eNB must perform the blind detection on all the possible total numbers of bits for the BI and the RI, resulting in a remarkable increase in the demodulation complexity. For example, the eNB needs to perform the blind detection in the case that the total number of bits for the BI and the RI is 2 (the number of bits for the BI is 1 and the number of bits for the RI is 1) and 3 (the number of bits for the BI is 1 and the number of bits for the RI is 2). As a result, the decoding complexity, the power consumption and the decoding error may increase, and thereby the system performance may be degraded.

In the embodiments of the present disclosure, the reference signal transmitted via the resource may include, but not limited to, a CSI-RS or a Common Reference Signal (CRS).

It should be appreciated that, in the embodiments of the present disclosure, the joint encoding operation on the BI and the RI may be implemented in two possible modes. One mode is shown in FIG. 4A, where a concatenation operation is performed on the bits for the BI and the RI, and then a resultant bit stream is inputted into, and encoded by, an encoding module. The other mode is shown in FIG. 4B, where the BI and the RI, as two variables, are inputted into, and encoded by, the encoding module. The variables inputted into the encoding module may be in different states with respect to different values of the RI and the BI, and the encoding module may perform the encoding operation in accordance with the states of the variables with respect to different combinations of the RI and the BI.

In the embodiments of the present disclosure, Step S31 of determining, by the UE, the first number of bits used for the joint encoding operation on the BI and the RI may be implemented in the following modes.

In Mode A, a second number of bits for encoding the RI is a function of a maximum number of antenna ports corresponding to the resource for transmitting the reference signal. To be specific, Step 31 includes: determining, by the UE, numbers of bits for the RIs corresponding to all resources for transmitting the reference signal; determining, by the UE, the second number of bits for encoding the RI in accordance with a maximum value of the numbers of bits for the RIs corresponding to all resources for transmitting the reference signal; and determining, by the UE, the first number of bits in accordance with the second number of bits and a number of bits corresponding to the BI.

In Mode A, the UE may determine the numbers of bits for the RIs corresponding to all resources for transmitting the reference signal in the following two possible modes.

Mode A1: the numbers of bits for the RIs corresponding to all resources for transmitting the reference signal are determined in accordance with a number of antenna ports corresponding to the resources. To be specific, the terminal may determine a number of bits for the RI corresponding to each resource for transmitting the reference signal in accordance with the number of antenna ports corresponding to each resource for transmitting the reference signal In Mode A1, the UE may determine the second number of bits for encoding the RI as $\max_{k,1\leq k\leq K}\lceil \log_2(N_k)\rceil$, where $N_k$ represents the number of antenna ports configured for a $k^{th}$ resource for transmitting the reference signal, K represents a number of the resources for transmitting the reference signal, and $\lceil\ \rceil$ represents a rounding-up operation.

For example, in the case that K=2, $N_1$=2 and $N_2$=4, the second number of bits may be $\log_2(4)$=2. The number of bits for the BI is 1, so the first number of bits determined by the UE may be 2+1=3.

Mode A2: the number of bits for the RI corresponding to each resource for transmitting the reference signal may be determined in accordance with a minimum value of the number of antenna ports corresponding to the resource and a maximum number of layers that is supported by the UE. To be specific, the UE may determine the number of bits for the RI corresponding to each resource for transmitting the reference signal in accordance with the minimum value of the number of antenna ports corresponding to each resource for transmitting the reference signal and the maximum number of layers that is supported by the UE.

In Mode A2, the UE may determine the second number of bits for encoding the RI as $\max_{k,1\leq k\leq K}\lceil \log_2(\min(L,N_k))\rceil$, where L represents the the maximum number of layers that is supported by the UE, and $\lceil\ \rceil$ represents a rounding-up operation.

For example, in the case that K=2, $N_1$=2, $N_2$=4 and L=2, the second number of bits may be 1. The number of bits for the BI is 1, so the first number of bits determined by the UE may be 1+1=2.

Based on the above Mode A1 or A2, the method may further include, in the case that the number of bits for the RI corresponding to the resource for transmitting the reference signal is smaller than the second number of bits, performing, by the UE, a bit padding operation on the RI corresponding to the resource for transmitting the reference signal in accordance with a predetermined bit padding rule.

For example, in the case that a value of the BI fed back by the UE is 1 (its bit value is 0), the RI may be measured on a first resource, and the number of bits for the RI is 1 and smaller than $\log_2(4)$=2. At this time, the UE may perform the bit padding operation on the 1-bit RI measured on the first resource, so that the number of bits for the RI acquired after the bit padding operation is 2. In the case that a filled bit has a value of 0 and filled at a position before the bits for RI, and RI=1 (i.e., its bit value is 0), a filled bit sequence may be 00. In the case that RI=2 (i.e., its bit value is 1), the filled bit sequence is 01. In the case that the value of the BI fed back by the UE is 2 (its bit value is 1), the RI may be measured on a second resource. The number of bits for the RI is 2 and equal to $\log_2(4)$=2. At this time, it is unnecessary to perform the bit padding operation on the RI, and a concatenation operation may be performed on bits for the BI and the RI, to generate a 3-bit sequence. Without loss of generality, a first bit in the 3-bit sequence may be used to represent the 1-bit BI, and the second and third bits may be used to represent the 2-bit RI. The UE may then transmit the information about the 3-bit sequence of the BI and the RI to the encoding module. Then, the information is encoded by the encoding module and transmitted over an uplink channel.

As an equivalent method, after the UE has selected the optimum CSI-RS resource and acquired the BI indicating the index of the CSI-RS resource, the UE may measure a value of the RI on the optimum CSI-RS resource, and convert it into an n-bit sequence in a binary form, where n represents the second number of bits and it is equal $\max_{k,1\leq k\leq K}\lceil \log_2(N_k)\rceil$. For example, in the case that BI=1 and the optimum CSI-RS resource is a first CSI-RS resource, the value of RI may be 1 or 2. In the case that the value of RI is converted into the bit sequent, the RI measured on the first CSI-RS resource may be converted into a bit sequence having $\log_2(4)$=2 bits, e.g., RI=1 may be converted into 00, and RI=2 may be converted into 01. In other words, although the RI merely has two possible values (RI=1 or RI=2) and it is represented by a 1-bit sequence, the value of the RI may still be converted into a bit sequence having two bits (n=$\max_{k,1\leq k\leq K}\lceil \log_2(N_k)\rceil$=2).

In a possible embodiment of the present disclosure, in the case of performing the bit padding operation, 1, 0 or any other value may be used. In other words, a numeric value of the filled bit will not be particularly defined herein, and it may be selected in accordance with the practical need.

In a possible embodiment of the present disclosure, in the case of performing the bit padding operation, the filled bit may be located before or after the bits for the RI, or at any other position (e.g., in the middle of the bits for the RI. In other words, the position of the filled bit will not be particularly defined herein, and it may be selected in accordance with the practical need.

In this mode, in the encoding information acquired after the joint encoding operation, previous M1 bits are used to represent the BI and the following M2 bits are used to represent the RI, or the previous M1 bits are used to represent the RI and the following M2 bits are used to represent the BI, where a sum of M1 and M2 is just the first number of bits. For example, in the case that the first number of bits determined by the UE is 3, a first bit in the 3-bit information may be used to represent the BI, and a second bit and a third bit may be used to represent the RI.

In Mode B, the first number of bits is a function of a total number of possible values of the RIs corresponding to all resources for transmitting the reference signal. To be specific, Step 31 includes: determining, by the UE, the total number of the possible values of the RIs corresponding to all resources for transmitting the reference signal; and determining, by the UE, the first number of bits in accordance with the total number of the possible values of the RIs corresponding to all resources for transmitting the reference signal.

For example, in the case that K=2, $N_1$=2, $N_2$=4 and the number of bits for the RI corresponding to the first resource for transmitting the reference signal is 1, the possible value of the RI may be 1 or 2. In the case that the number of bits for the RI corresponding to the first resource for transmitting the reference signal is 2, the possible value of the RI may be 1 (with a bit value of 00), 2 (with a bit value of 01), 3 (with a bit value of 10) or 4 (with a bit value of 11). Hence, the total number of the possible values of the RI may be 6, and the first number of bits may be $\lceil \log_2(6) \rceil$=3. When performing the joint encoding operation, the RIs corresponding to all resources for transmitting the reference signal may be represented using 3-bit information. For example, 000 represents that the BI corresponds to the first CSI-RS resource, and a value of the RI corresponding to a first resource for transmitting the reference signal is 1; 001 represents that the BI corresponds to the first CSI-RS resource, and a value of the RI corresponding to the first resource for transmitting the reference signal is 2; 010 represents that the BI corresponds to a second CSI-RS resource, and a value of the RI corresponding to a second resource for transmitting the reference signal is 1; 011 represents that the BI corresponds to the second CSI-RS resource, and a value of the RI corresponding to the second resource for transmitting the reference signal is 2; 100 represents that the BI corresponds to the second CSI-RS resource, and a value of the RI corresponding to the second resource for transmitting the reference signal is 3; and 101 represents that the BI corresponds to the second CSI-RS resource, and a value of the RI corresponding to the second resource for transmitting the reference signal is 4.

In Mode B, the UE may determine the total number of the possible values of the RIs corresponding to all resources for transmitting the reference signal in the following two possible modes.

Mode B1: the total number of the possible values of the RI corresponding to each resource for transmitting the reference signal may be determined in accordance with the number of antenna ports corresponding to the resource. To be specific, the UE may determine a total number of the antenna ports corresponding to the resources for transmitting the reference signal as the total number of the possible values of the RIs corresponding to all resources for transmitting the reference signal.

In this mode, the first number of bits may be determined by the UE using the following equation: $A = \lceil \log_2(\Sigma_{1 \leq k \leq K} N_k) \rceil$, where A represents the first number of bits, $N_k$ represents the number of antenna ports corresponding to a $k^{th}$ resource for transmitting the reference signal, K represents a number of resources for transmitting the reference signal, and $\lceil \ \rceil$ represents a rounding-up operation.

For example, in the case that K=2, $N_1$=2 and $N_2$=4, $A = \lceil \log_2(2+4) \rceil$=3.

Mode B2: the total number of the possible values of the RIs corresponding to all resources for transmitting the reference signal may be determined in accordance with the minimum value of the number of the antenna ports corresponding to each resource for transmitting the reference signal and the maximum number of layers that is supported by the UE. To be specific, the UE may determine the minimum value of the number of the antenna ports corresponding to each resource for transmitting the reference signal and the maximum number of layers that is supported by the UE, and determine a sum of the minimum values as the total number of the possible values of the RIs corresponding to all resources for transmitting the reference signal.

In this mode, the first number of bits may be determined by the UE using the following equation: $A = \lceil \log_2(\Sigma_{1 \leq k \leq K} \min\{L, N_k\}) \rceil$, where A represents the first number of bits, $N_k$ represents the number of antenna ports corresponding to a kth resource for transmitting the reference signal, K represents a number of resources for transmitting the reference signal, L represents the maximum layers that is supported by the UE, and $\lceil \ \rceil$ represents a rounding-up operation.

For example, in the case that K=2, $N_1$=2, $N_2$=4 and L=2, $A = \lceil \log_2(2+2) \rceil$=2.

Based on an identical inventive concept, the present disclosure provides in some embodiments a method for receiving CSI corresponding to the transmission method in FIG. 3. As shown in FIG. 5, the method for receiving the CSI includes: Step S51 of determining, by a base station, a first number of bits used for a joint encoding operation on a BI and a RI, the BI being configured to indicate an index of a resource for transmitting a reference signal corresponding to the RI measured by a UE, an identical first number of bits being used for the joint encoding operation on RI(s) and the BI corresponding to all resources for transmitting the reference signal; Step S52 of performing, by the base station, a joint decoding operation on encoding information acquired after the jointed encoding operation on the RI and the BI corresponding to the resource for transmitting the reference signal from the UE in accordance with the first number of bits, to acquire the RI corresponding to the resource for transmitting the reference signal.

According to the method in the embodiments of the present disclosure, the base station determines the first number of bits used for the joint encoding operation on the BI and the RI, and performs the joint decoding operation on the encoding information acquired after the jointed encoding operation on the RI and the BI corresponding to the resource for transmitting the reference signal from the UE, to acquire the RI corresponding to the resource for transmitting the reference signal. An identical first number of bits are used for the joint encoding operation on the RIs corresponding to all resources for transmitting the reference signal and the BI, so it is able for the base station to perform the joint decoding operation on the encoding information reported by the UE in accordance with the first number of bits, to acquire the RI and the BI corresponding to the resource for transmitting the reference signal. It is unnecessary for the base station to perform blind detection, so it is able to reduce the complexity in the decoding operation, the power consumption and the decoding error at the base station side.

In a possible embodiment of the present disclosure, the step of determining, by the base station, the first number of bits used for the joint encoding operation on the BI and the RI includes: determining, by the base station, numbers of bits for the RIs corresponding to all resources for transmitting the reference signal; determining, by the base station, a second number of bits for encoding the RI in accordance with a maximum value of the numbers of bits for the RIs corresponding to all resources for transmitting the reference signal; and determining, by the base station, the first number of bits in accordance with the second number of bits and a number of bits corresponding to the BI.

In a possible embodiment of the present disclosure, the step of determining, by the base station, the numbers of bits for the RIs corresponding to all resources for transmitting the reference signal includes: determining, by the base station, a number of bits for the RI corresponding to each resource for transmitting the reference signal in accordance with a number of antenna ports corresponding to each resource for transmitting the reference signal (referring to the above-mentioned Mode A1); or determining, by the base station, a number of bits for the RI corresponding to each resource for transmitting the reference signal in accordance with a minimum value of the number of antenna ports corresponding to each resource for transmitting the reference signal and a maximum number of layers that is supported by the UE (referring to the above-mentioned Mode A2).

In a possible embodiment of the present disclosure, Step S52 includes: performing, by the base station, the joint decoding operation on the encoding information from the UE in accordance with the first number of bits, to acquire the BI and the RI; determining, by the base station, that the number of bits for the RI corresponding to the resource for transmitting the reference signal is smaller than the second number of bits; and acquiring, by the base station, the RI corresponding to the resource for transmitting the reference signal in accordance with the RI and a predetermined bit padding rule.

In a possible embodiment of the present disclosure, the step of determining, by the base station, the first number of bits used for the joint encoding operation on the BI and the RI includes: determining, by the base station, a total number of possible values of the RIs corresponding to all resources for transmitting the reference signal; and determining, by the base station, the first number of bits in accordance with the total number of the possible values of the RIs corresponding to all resources for transmitting the reference signal In a possible embodiment of the present disclosure, the step of determining, by the base station, the total number of the possible values of the RIs corresponding to all resources for transmitting the reference signal includes: determining, by the base station, a total number of the antenna ports corresponding to the resources for transmitting the reference signal as the total number of the possible values of the RIs corresponding to all resources for transmitting the reference signal (referring to the above-mentioned Mode B1); or determining, by the base station, a minimum value of a number of the antenna ports corresponding to each resource for transmitting the reference signal and the maximum number of layers that is supported by the UE, and determining a sum of the minimum values as the total number of the possible values of the RIs corresponding to all resources for transmitting the reference signal (referring to the above-mentioned Mode B2).

In a possible embodiment of the present disclosure, the first number of bits is determined by the base station using the following equation: $A=\lceil \log_2(\Sigma_{1\leq k\leq K} N_k) \rceil$, or $A=\lceil \log_2(\Sigma_{1\leq k\leq K} \min\{L, N_k\}) \rceil$, where A represents the first number of bits, $N_k$ represents the number of antenna ports corresponding to a $k^{th}$ resource for transmitting the reference signal, K represents a number of resources for transmitting the reference signal, L represents the maximum layers that is supported by the UE, and $\lceil \ \rceil$ represents a rounding-up operation.

The present disclosure further provides in some embodiments a method for transmitting CSI which, as shown in FIG. 6, includes: Step S61 of determining, by a UE, a total number of bits for a BI and a RI for transmitting a reference signal, the BI being configured to indicate an index of the resource for transmitting the reference signal corresponding to the RI measured by the UE; and Step S62 of performing, by the UE, a joint encoding operation on the RI and the BI in accordance with the total number of bits to acquire encoding information, and transmitting indication information indicating the total number of bits for the BI and the RI and the encoding information.

According to the method in the embodiments of the present disclosure, the UE transmits the indication information indicating the total number of bits for the BI and the RI for transmitting the reference signal and the encoding information, so that the base station determines the total number of bits for the BI and the RI for transmitting the reference signal in accordance with the indication information. As a result, it is able for the base station to perform the joint decoding operation on the encoding information from the UE in accordance with the total number of bits, thereby to acquire the RI corresponding to the resource for transmitting the reference signal and the BI indicating the index of the resource for transmitting the reference signal. It is unnecessary for the base station to perform blind detection, so it is able to reduce the complexity in the decoding operation, the power consumption and the decoding error at the base station side.

In the embodiments of the present disclosure, the reference signal transmitted over the resource may include, but not limited to, a CSI-RS or a CRS.

In a possible embodiment of the present disclosure, in Step S61, the UE may determine the total number of bits for the BI and the RI corresponding to the resource for transmitting the reference signal in the above-mentioned Mode A and Mode B.

In a possible embodiment of the present disclosure, Step S61 of determining, by the UE, the total number of bits for the BI and the RI corresponding to the resource for transmitting the reference signal includes determining, by the UE, a number of bits for the RI in accordance with a minimum value of a maximum number of layers that is supported by the UE and a number of antenna ports corresponding to the resource for transmitting the reference signal, and determining the total number of bits in accordance with the number of bits for the RI and the number of bits for the BI.

In the embodiments of the present disclosure, in the case that the CSI-RS is configured, the indication information representing the total number of bits for the BI and the RI may also be called as CSI payload indicator (CPI).

For example, one bit may be used to represent different states of the CPI, and thereby to represent the total number of bits for the RI and the BI, as shown in Table 1.

TABLE 1

| Value of CPI | Total number of bits for BI/RI |
|---|---|
| 0 | 2 bits |
| 1 | 3 bits |

In a possible embodiment of the present disclosure, a number of bits for the indication information is $\lceil \log_2(K) \rceil$, where K represents a number of resources for transmitting the reference signal, and $\lceil \ \rceil$ represents a rounding-up operation.

In a possible embodiment of the present disclosure, the number of bits for the indication information is $\lceil \log_2(S) \rceil$, where S=unique($N_k$, 1≤k≤K) and S represents a total number of values in numbers of the antenna ports corresponding to the resources for transmitting the reference signal, and $N_k$ represents a number of the antenna ports corresponding to a $k^{th}$ resource for transmitting the reference signal. For example, in the case that three CSI-RS resources have been configured, a number of antenna ports corresponding to a first CSI-RS resource may be 2, a number of antenna ports corresponding to a second CSI-RS resource may be 2, and a number of antenna ports corresponding to a third CSI-RS resource maybe 4. There are two values (2 and 4), so S=2.

In a possible embodiment of the present disclosure, the number of bits for the indication information is $\lceil \log_2(B) \rceil$, where B=unique($\log_2[N_k]$, 1≤k≤K) and B represents a total number of values in numbers of bits corresponding to the numbers of antenna ports corresponding to the resources for transmitting the reference signal, and $N_k$ represents a number of the antenna ports corresponding to the $k^{th}$ resource for transmitting the reference signal.

In a possible embodiment of the present disclosure, the number of bits for the indication information is $\lceil \log_2(P) \rceil$, where P=unique(min{$N_k$,L}, 1≤k≤K) and P represents a total number of values in the numbers of antenna ports corresponding to the resources for transmitting the reference signal and not greater than the maximum number of layers that is supported by the UE, L represents the maximum number of layers that is supported by the UE, and $N_k$ represents a number of the antenna ports corresponding to the $k^{th}$ resource for transmitting the reference signal.

In a possible embodiment of the present disclosure, the number of bits for the indication information is $\lceil \log_2(Y) \rceil$, where Y=unique($\lceil \log_2 \min\{N_k,L\} \rceil$, 1≤k≤K) and Y represents a total number of values in the number of bits corresponding to the numbers of antenna ports corresponding to the resources for transmitting the reference signal and not greater than the maximum number of layers that is supported by the UE, L represents the maximum number of layers that is supported by the UE, and $N_k$ represents a number of the antenna ports corresponding to the $k^{th}$ resource for transmitting the reference signal.

In the embodiments of the present disclosure, Step S62 of transmitting, by the UE, the indication information representing the total number of bits for the RI and the BI and the encoding information may be implemented in the following two possible modes.

Mode 1: the UE may transmit the indication information within a first subframe and transmit the encoding information within a second subframe subsequent to the first subframe.

Figure 7A:
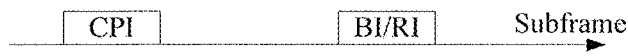
FIG. 7A is a schematic view showing a procedure of reporting indication information and encoding information by a UE to a base station within different subframes.

For example, as shown in FIG. 7A, the CPI is reported within one subframe, and the BI/RI is reported within another subframe, so the CPI reported within a CPI report subframe is used to indicate the total number of bits for the BI/RI reported within a subsequent BI/RI report subframe. The CPI report subframe represents a subframe within which the CPI is reported, and the BI/RI report subframe represents a subframe within which the BI/RI is reported.

Mode 2: the UE may transmit the indication information and the encoding information within an identical subframe using an independent encoding mode.

Figure 7B:
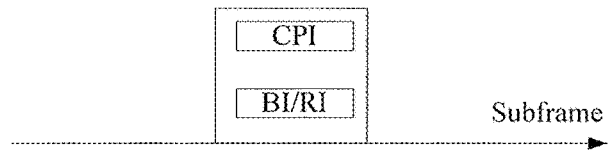
FIG. 7B is a schematic view showing a procedure of reporting the indication information and the encoding information by the UE to the base station within an identical subframe.

For example, as shown in FIG. 7B, the CPI and the RI/BI are transmitted within an identical subframe. In this case, the CPI and the BI/RI must be encoded independently, so that the base station may decode the CPI before the joint decoding operation on the BI/RI to acquire a total number of bits corresponding to the CPI.

For a physical channel for feeding back the indication information and the encoding information, in Step S62, the UE may transmit the indication information representing the total number of bits for the RI and the BI and the encoding information in the following four possible modes.

Mode 1: the UE may transmit the indication information and the encoding information via a PUCCH. In this mode, the UE may transmit the indication information and the encoding information via the PUCCH within an identical subframe. At this time, the indication information and the encoding information must be encoded independently. The UE may also transmit the indication information and the encoding information via the PUCCHs within different subframes respectively. At this time, the indication information may be transmitted prior to the encoding information.

Mode 2: the UE may transmit the indication information and the encoding information via PUSCHs within different subframes respectively.

Mode 3: the UE may transmit the indication information via the PUCCH, and transmit the encoding information via the PUSCH.

Mode 4: the UE may transmit the indication information via the PUSCH, and transmit the encoding information via the PUCCH.

Figure 8:
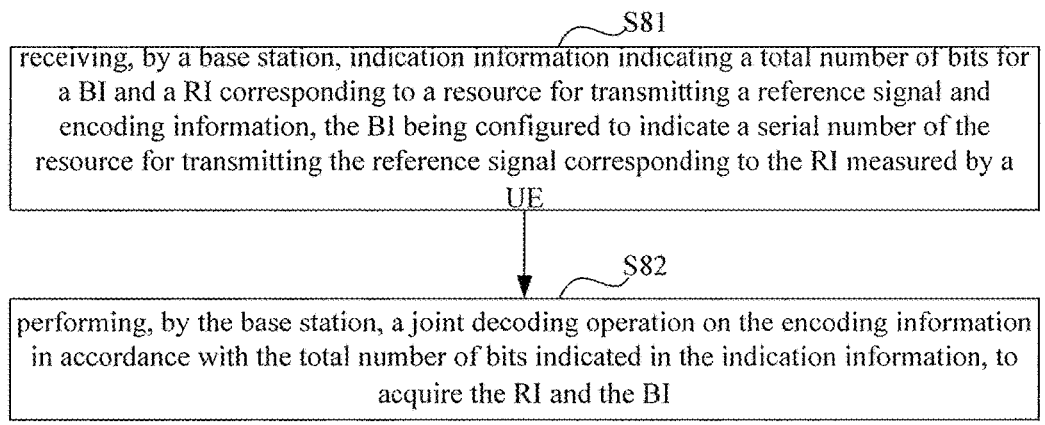
FIG. 8 is a flow chart of a method for receiving CSI according to one embodiment of the present disclosure.

Based on an identical inventive concept, the present disclosure further provides in some embodiments a method for receiving CSI corresponding to the transmission method in FIG. 6. As shown in FIG. 8, the method for receiving the CSI includes: Step S81 of receiving, by a base station, indication information indicating a total number of bits for a BI and a RI corresponding to a resource for transmitting a reference signal and encoding information, the BI being configured to indicate an index of the resource for transmitting the reference signal corresponding to the RI measured by a UE; Step S82 of performing, by the base station, a joint decoding operation on the encoding information in accordance with the total number of bits indicated in the indication information to acquire the RI and the BI.

According to the method in the embodiments of the present disclosure, the base station performs the joint decoding operation on the encoding information from the UE in accordance with the total number of bits indicated in the indication information, to acquire the RI corresponding to the resource for transmitting the reference signal and the BI indicating the index of the resource for transmitting the reference signal. It is unnecessary for the base station to perform blind detection, so it is able to reduce the complexity in the decoding operation, the power consumption and the decoding error at the base station side.

In a possible embodiment of the present disclosure, in Step S81, the base station may receive the indication information representing the total number of bits for the BI and the RI corresponding to the resource for transmitting the reference signal and the encoding information in the following two possible modes: the base station may receive the indication information within a first subframe and receive the encoding information within a second subframe subsequent to the first subframe; or the base station may receive the indication information and the encoding information within an identical subframe, the indication information and the encoding information being encoded using an independent encoding mode.

In a possible embodiment of the present disclosure, in Step S81, the base station may receive the indication information representing the total number of bits for the BI and the RI corresponding to the resource for transmitting the reference signal and the encoding information in the following four possible modes: the base station may receive the indication information and the encoding information via a PUCCH; or the base station may receive the indication information and the encoding information via PUSCHs within different subframes respectively; or the base station may receive the indication information via the PUCCH and receive the encoding information via the PUSCH; or the base station may receive the indication information via the PUSCH and receive the encoding information via the PUCCH.

Figure 9:
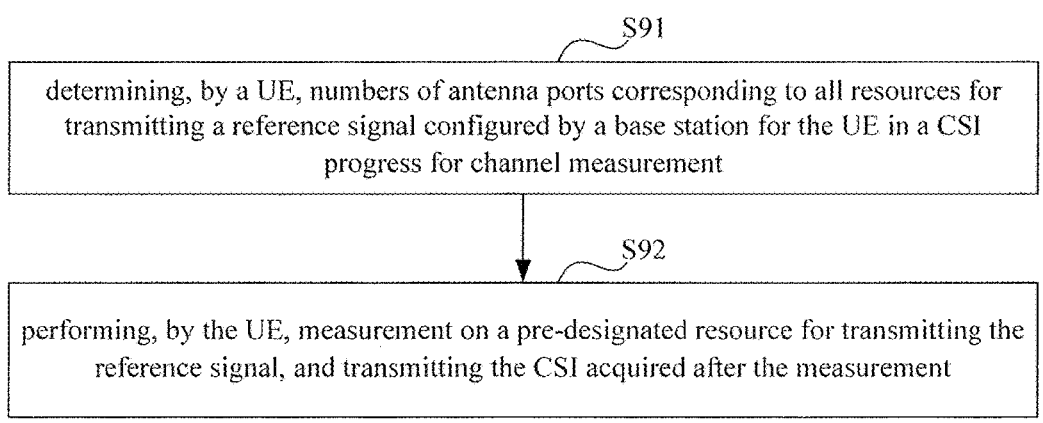
FIG. 9 is a flow chart of a method for transmitting CSI according to one embodiment of the present disclosure.

The present disclosure further provides in some embodiments a method for transmitting CSI which, as shown in FIG. 9, includes: Step S91 of determining, by a UE, that numbers of antenna ports corresponding to different resources for transmitting a reference signal configured by a base station for the UE in a CSI progress for channel measurement are different; and Step S92 of performing, by the UE, measurement on a pre-designated resource for transmitting the reference signal, and transmitting the CSI acquired after the measurement.

According to the method in the embodiments of the present disclosure, the UE measures the pre-designated resources for transmitting the reference signal, and transmits the CSI acquired after the measurement. The resource for transmitting the reference signal measured by the UE is known to the base station in advance, so the base station may determine the number of bits for the RI corresponding to the resource for transmitting the reference signal measured by the UE. As a result, it is able for the base station to decode the CSI from the UE in accordance with the number of bits corresponding to the RI, to acquire the RI measured by the UE.

In a possible embodiment of the present disclosure, the number of bits for the RI corresponding to the pre-designated resource for transmitting the reference signal may be determined in accordance with a minimum value of a maximum number of layers that is supported by the UE and a number of antenna ports corresponding to the pre-designated resource for transmitting the reference signal.

In a possible embodiment of the present disclosure, the pre-designated resource for transmitting the reference signal may be agreed between the UE and the base station, or designated by the base station and notified to the UE, or designated by the UE and fed back through the BI to the base station.

In a possible embodiment of the present disclosure, the method further includes transmitting, by the UE, a BI indicating an index of the resource for transmitting the reference signal measured by the UE.

In a possible embodiment of the present disclosure, the UE may transmit the BI and the CSI in the following modes: the UE may transmit the BI within a first subframe and transmit the CSI within a second subframe subsequent to the first subframe; or the UE may transmit the BI and the CSI within an identical subframe, the BI and the CSI being encoded using an independent encoding mode.

In a possible embodiment of the present disclosure, the UE may transmit the BI and the CSI in the following modes: the UE may transmit the BI and the CSI via a PUCCH; or the UE may transmit the BI and the CSI via PUSCHs within different subframes respectively; or the UE may transmit the BI via the PUCCH and transmit the CSI via the PUSCH; or the UE may transmit the BI via the PUSCH and transmit the CSI via the PUCCH.

Figure 10:
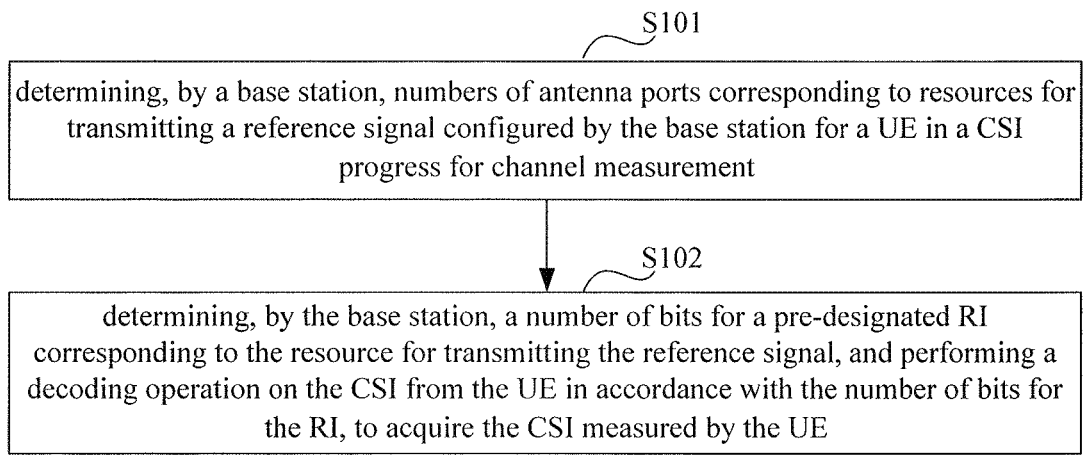
FIG. 10 is a flow chart of a method for receiving CSI according to one embodiment of the present disclosure.

Based on an identical inventive concept, the present disclosure further provides in some embodiments a method for receiving CSI corresponding to the transmission method in FIG. 9. As shown in FIG. 10, the method includes: Step S101 of determining, by a base station, that numbers of antenna ports corresponding to different resources for transmitting a reference signal configured by the base station for a UE in a CSI progress for channel measurement are different; and Step S102 of determining, by the base station, a number of bits for a RI corresponding to a pre-designated resource for transmitting the reference signal, and performing a decoding operation on the CSI from the UE in accordance with the number of bits for the RI, to acquire the CSI measured by the UE.

In a possible embodiment of the present disclosure, the number of bits for the RI corresponding to the pre-designated resource for transmitting the reference signal may be determined in accordance with a minimum value of a maximum number of layers that is supported by the UE and a number of antenna ports corresponding to the pre-designated resource for transmitting the reference signal.

In a possible embodiment of the present disclosure, the pre-designated resource for transmitting the reference signal may be agreed between the UE and the base station, or designated by the base station and notified to the UE, or designated by the UE and fed back through the BI to the base station.

In a possible embodiment of the present disclosure, the method further includes receiving, by the base station, a BI indicating an index of the resource for transmitting the reference signal from the UE.

In a possible embodiment of the present disclosure, the base station may receive the BI and the CSI in the following modes: the base station may receive the BI within a first subframe and receive the CSI within a second subframe subsequent to the first subframe; or the base station may receive the BI and the CSI within an identical subframe, the BI and the CSI being encoded using an independent encoding mode.

In a possible embodiment of the present disclosure, the base station may receive the BI and the CSI in the following modes: the base station may receive the BI and the CSI via a PUCCH; or the base station may receive the BI and the CSI via PUSCHs within different subframes respectively; or the base station may receive the BI via the PUCCH and receive the CSI via the PUSCH; or the base station may receive the BI via the PUSCH and receive the CSI via the PUCCH.

Figure 11:
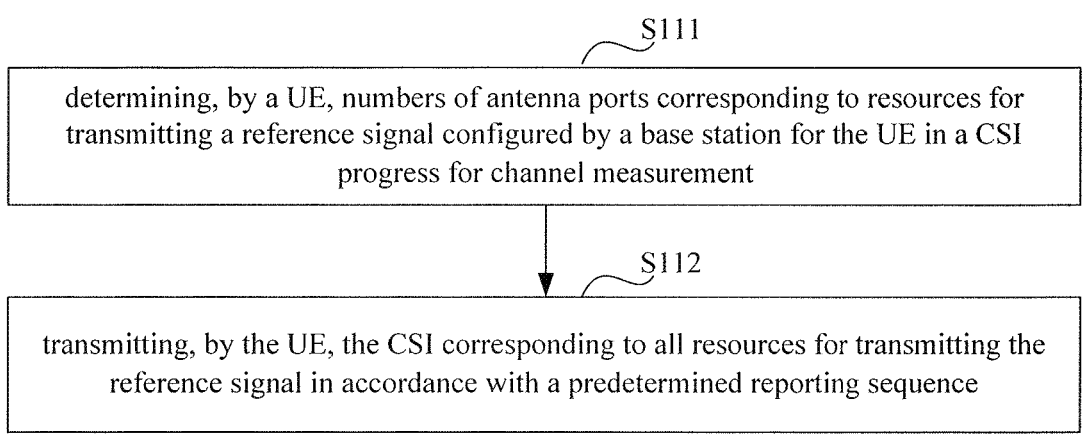
FIG. 11 is a flow chart of a method for transmitting CSI according to one embodiment of the present disclosure.

The present disclosure further provides in some embodiments a method for transmitting CSI which, as shown in FIG. 11, includes: Step S111 of determining, by a UE, that numbers of antenna ports corresponding to different resources for transmitting a reference signal configured by a base station for the UE in a CSI progress for channel measurement are different; and Step S112 of transmitting, by the UE, the CSI corresponding to the resources for transmitting the reference signal in accordance with a predetermined reporting sequence.

According to the embodiments of the present disclosure, the UE transmit the CSI acquired after the measurement on the resources for transmitting the reference signal in accordance with the predetermined report sequence. The reporting sequence is known to the base station, so the base station may determine the number of bits for the RI transmitted by the UE each time. As a result, it is able for the base station to decode the CSI from the UE in accordance with the number of bits for the RI, thereby to acquire the RI measured by the UE.

In a possible embodiment of the present disclosure, the method further includes transmitting, by the UE, a BI indicating an index of the resource for transmitting the reference signal measured by the UE.

To be specific, the UE may further transmit the BI indicating the index of the resource for transmitting the reference signal measured by the UE.

In a possible embodiment of the present disclosure, the UE may transmit the BI and the CSI in the following modes: the UE may transmit the BI within a first subframe and transmit the CSI within a second subframe subsequent to the first subframe; or the UE may transmit the BI and the CSI within an identical subframe, the BI and the CSI being encoded using an independent encoding mode.

In a possible embodiment of the present disclosure, the UE may transmit the BI and the CSI in the following modes: the UE may transmit the BI and the CSI via a PUCCH; or the UE may transmit the BI and the CSI via PUSCHs within different subframes; or the UE may transmit the BI via the PUCCH and transmit the CSI via the PUSCH; or the UE may transmit the BI via the PUSCH and transmit the CSI via the PUCCH.

Figure 12:
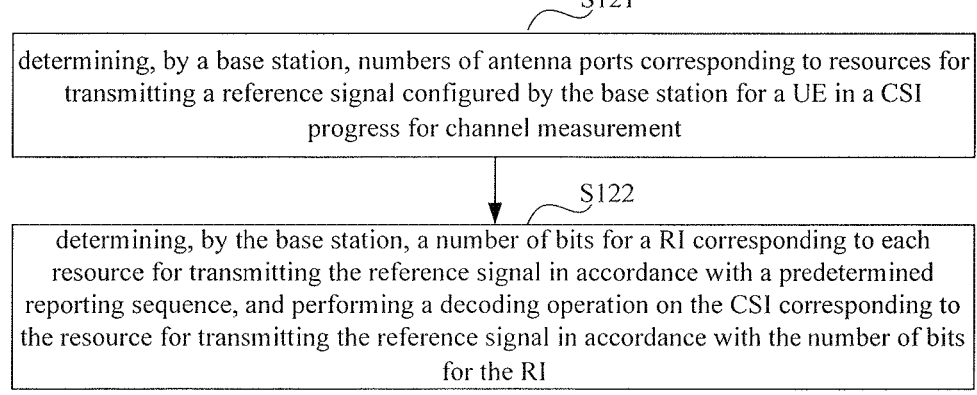
FIG. 12 is a flow chart of a method for receiving CSI according to one embodiment of the present disclosure.

Based on an identical inventive concept, the present disclosure further provides in some embodiments a method for receiving CSI corresponding to the transmission method in FIG. 11. As shown in FIG. 12, the method includes: Step S121 of determining, by a base station, that numbers of antenna ports corresponding to different resources for transmitting a reference signal configured by the base station for a UE in a CSI progress for channel measurement are different; and Step S122 of determining, by the base station, a number of bits for a RI corresponding to each resource for transmitting the reference signal in accordance with a predetermined reporting sequence, and performing a decoding operation on the CSI corresponding to the resource for transmitting the reference signal in accordance with the number of bits for the RI.

In a possible embodiment of the present disclosure, the method further includes receiving, by the base station, a BI indicating an index of the resource for transmitting the reference signal measured by the UE from the UE.

In a possible embodiment of the present disclosure, the base station may receive the BI and the CSI in the following modes: the base station may receive the BI within a first subframe and receive the CSI within a second subframe subsequent to the first subframe; or the base station may receive the BI and the CSI within an identical subframe, the BI and the CSI being encoded using an independent encoding mode.

In a possible embodiment of the present disclosure, the base station may receive the BI and the CSI in the following modes: the base station may receive the BI and the CSI via a PUCCH; or the base station may receive the BI and the CSI via PUSCHs within different subframes respectively; or the base station may receive the BI via the PUCCH and receive the CSI via the PUSCH; or the base station may receive the BI via the PUSCH and receive the CSI via the PUCCH.

It should be appreciated that, apart from the above, the present disclosure further provides in some embodiments another scheme where, after the UE has determined that the numbers of the antenna ports corresponding to the different resources for transmitting the reference signal configured by the base station for the UE in the CSI progress for channel measurement are different, the UE measures each resource for transmitting the reference signal but not transmit the CSI acquired after the measurement, or the UE measures the CSI with respect to each resource and transmit the CSI acquired after the measurement.

In a possible embodiment of the present disclosure, in the case of transmitting the CSI, the UE may further transmit a BI indicating an index of the resource for transmitting the reference signal.

The above methods may be executed by a software program which may be stored in a storage medium. The software program is called, so as to execute the above-mentioned steps.

Based on an identical inventive concept, the present disclosure further provides in some embodiments a device for transmitting CSI. A principle of the device is similar to that of the method in FIG. 3, so the implementation thereof may refer to that of the method and will not be particularly defined herein.

Figure 13:
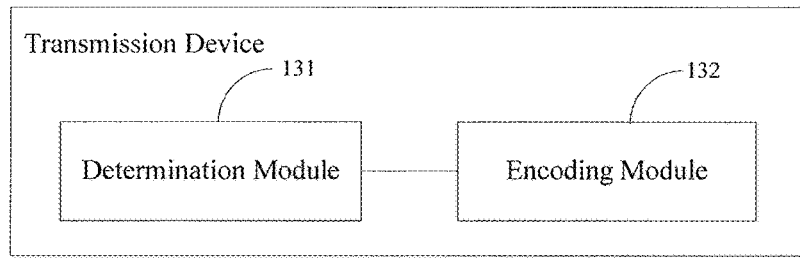
FIG. 13 is a schematic view showing a device for transmitting CSI according to one embodiment of the present disclosure.

As shown in FIG. 13, the device includes: a determination module 131 configured to determine a first number of bits used for a joint encoding operation on a BI and a RI, the BI being configured to indicate an index of a resource for transmitting a reference signal corresponding to the RI measured by a UE, an identical first number of bits being used for the joint encoding operation on RI(s) and the BI corresponding to all resources for transmitting the reference signal; and an encoding module 132 configured to perform the joint encoding operation on the RI and the BI in accordance with the first number of bits so as to acquire encoding information, and transmit the encoding information.

In a possible embodiment of the present disclosure, the determination module 131 is further configured to: determine numbers of bits for the RIs corresponding to all resources for transmitting the reference signal; determine a second number of bits for encoding the RI in accordance with a maximum value of the numbers of bits for the RIs corresponding to all resources for transmitting the reference signal; and determine the first number of bits in accordance with the second number of bits and a number of bits corresponding to the BI.

In a possible embodiment of the present disclosure, the determination module 131 is further configured to: determine a number of bits for the RI corresponding to each resource for transmitting the reference signal in accordance with a number of antenna ports corresponding to each resource for transmitting the reference signal; or determine a number of bits for the RI corresponding to each resource for transmitting the reference signal in accordance with a minimum value of the number of antenna ports corresponding to each resource for transmitting the reference signal and a maximum number of layers that is supported by the UE.

In a possible embodiment of the present disclosure, the encoding module 132 is further configured to: in the case that the number of bits for the RI corresponding to the resource for transmitting the reference signal is smaller than the second number of bits, perform a bit padding operation on the RI corresponding to the resource for transmitting the reference signal in accordance with a predetermined bit padding rule; and perform the joint encoding operation on the RI acquired after the bit padding operation and the BI in accordance with the first number of bits.

In a possible embodiment of the present disclosure, the determination module 131 is further configured to: determine a total number of possible values of the RIs corresponding to all resources for transmitting the reference signal; and determine the first number of bits in accordance with the total number of the possible values of the RIs corresponding to all resources for transmitting the reference signal.

In a possible embodiment of the present disclosure, the determination module 131 is further configured to: determine a total number of the antenna ports corresponding to the resources for transmitting the reference signal as the total number of the possible values of the RIs corresponding to all resources for transmitting the reference signal; or determine a minimum value of a number of the antenna ports corresponding to each resource for transmitting the reference signal and the maximum number of layers that is supported by the UE, and determine a sum of the minimum values as the total number of the possible values of the RIs corresponding to all resources for transmitting the reference signal.

In a possible embodiment of the present disclosure, the first number of bits is determined by the determination module 131 using the following equation: $A=\lceil \log_2(\Sigma_{1\leq k\leq K}N_k)\rceil$, or $A=\lceil \log_2(\Sigma_{1\leq k\leq K} \min\{L,N_k\})\rceil$, where A represents the first number of bits, $N_k$ represents the number of antenna ports corresponding to a $k^{th}$ resource for transmitting the reference signal, K represents a number of resources for transmitting the reference signal, L represents the maximum layers that is supported by the UE, and $\lceil \ \rceil$ represents a rounding-up operation.

Based on an identical inventive concept, the present disclosure further provides in some embodiments a device for receiving CSI. A principle of the device is similar to that of the method in FIG. 5, so the implementation thereof may refer to that of the method and will not be particularly defined herein.

Figure 14:
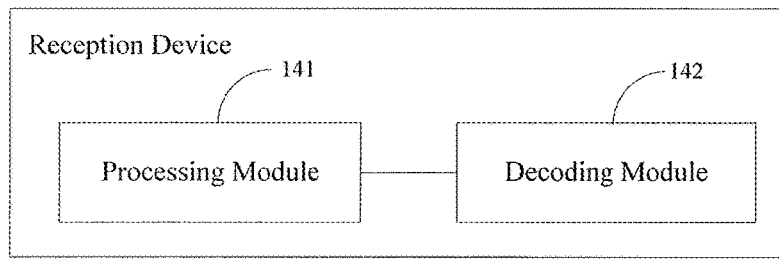
FIG. 14 is a schematic view showing a device for receiving CSI according to one embodiment of the present disclosure.

As shown in FIG. 14, the device includes: a processing module 141 configured to determine a first number of bits used for a joint encoding operation on a BI and a RI, the BI being configured to indicate an index of a resource for transmitting a reference signal corresponding to the RI measured by a UE, an identical first number of bits being used for the joint encoding operation on RI(s) and the BI corresponding to all resources for transmitting the reference signal; a decoding module 142 configured to perform a joint decoding operation on encoding information from the UE in accordance with the first number of bits, to acquire the RI corresponding to the resource for transmitting the reference signal.

In a possible embodiment of the present disclosure, the processing module 141 is further configured to: determine numbers of bits for the RIs corresponding to all resources for transmitting the reference signal; determine a second number of bits for encoding the RI in accordance with a maximum value of the numbers of bits for the RIs corresponding to all resources for transmitting the reference signal; and determine the first number of bits in accordance with the second number of bits and a number of bits corresponding to the BI.

In a possible embodiment of the present disclosure, the processing module 141 is further configured to: determine a number of bits for the RI corresponding to each resource for transmitting the reference signal in accordance with a number of antenna ports corresponding to each resource for transmitting the reference signal; or determine a number of bits for the RI corresponding to each resource for transmitting the reference signal in accordance with a minimum value of the number of antenna ports corresponding to each resource for transmitting the reference signal and a maximum number of layers that is supported by the UE.

In a possible embodiment of the present disclosure, the decoding module 142 is further configured to: perform the joint decoding operation on the encoding information from the UE in accordance with the first number of bits, to acquire the BI and the RI; determine that the number of bits for the RI corresponding to the resource for transmitting the reference signal is smaller than the second number of bits; and acquire the RI corresponding to the resource for transmitting the reference signal in accordance with the RI and a predetermined bit padding rule.

In a possible embodiment of the present disclosure, the processing module 141 is further configured to: determine a total number of possible values of the RIs corresponding to all resources for transmitting the reference signal; and determine the first number of bits in accordance with the total number of the possible values of the RIs corresponding to all resources for transmitting the reference signal.

In a possible embodiment of the present disclosure, the processing module 141 is further configured to: determine a total number of the antenna ports corresponding to the resources for transmitting the reference signal as the total number of the possible values of the RIs corresponding to all resources for transmitting the reference signal; or determine a minimum value of a number of the antenna ports corresponding to each resource for transmitting the reference signal and the maximum number of layers that is supported by the UE, and determine a sum of the minimum values as the total number of the possible values of the RIs corresponding to all resources for transmitting the reference signal.

In a possible embodiment of the present disclosure, the first number of bits is determined by the processing module 141 using the following equation: $A=\lceil \log_2(\Sigma_{1\leq k\leq K}N_k)\rceil$, or $A=\lceil \log_2(\Sigma_{1\leq k\leq K} \min\{L,N_k\})\rceil$, where A represents the first number of bits, $N_k$ represents the number of antenna ports corresponding to a kth resource for transmitting the reference signal, K represents a number of resources for transmitting the reference signal, L represents the maximum layers that is supported by the UE, and $\lceil \ \rceil$ represents a rounding-up operation.

Based on an identical inventive concept, the present disclosure further provides in some embodiments a device for transmitting CSI. A principle of the device is similar to that of the method in FIG. 6, so the implementation thereof may refer to that of the method and will not be particularly defined herein.

Figure 15:
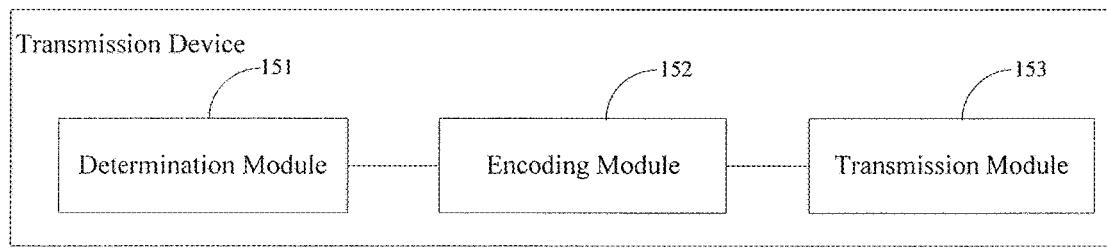
FIG. 15 is a schematic view showing a device for transmitting CSI according to one embodiment of the present disclosure.

As shown in FIG. 15, the device includes: a determination module 151 configured to determine a total number of bits for a BI and a RI for transmitting a reference signal, the BI being configured to indicate an index of the resource for transmitting the reference signal corresponding to the RI measured by a UE; an encoding module 152 configured to perform a joint encoding operation on the RI and the BI in accordance with the total number of bits to acquire encoding information; and a transmission module 153 configured to transmit indication information indicating the total number of bits for the BI and the RI and the encoding information.

In a possible embodiment of the present disclosure, the determination module 151 is further configured to determine the total number of bits for the BI and the RI acquired after measuring the resource for transmitting the reference signal in the above-mentioned Modes A and B.

In a possible embodiment of the present disclosure, the determination module 151 is further configured to determine a number of bits for the RI in accordance with a minimum value of a maximum number of layers that is supported by the UE and a number of antenna ports corresponding to the resource for transmitting the reference signal, and determine the total number of bits in accordance with the number of bits for the RI and the number of bits for the BI.

In a possible embodiment of the present disclosure, a number of bits for the indication information is $\lceil \log_2(K) \rceil$, where K represents a number of resources for transmitting the reference signal, and $\lceil \ \rceil$ represents a rounding-up operation.

In a possible embodiment of the present disclosure, the number of bits for the indication information is $\lceil \log_2(S) \rceil$, where S=unique($N_k$, 1≤k≤K) and S represents a total number of values in numbers of the antenna ports corresponding to the resources for transmitting the reference signal, and $N_k$ represents a number of the antenna ports corresponding to a $k^{th}$ resource for transmitting the reference signal. For example, in the case that three CSI-RS resources have been configured, a number of antenna ports corresponding to a first CSI-RS resource may be 2, a number of antenna ports corresponding to a second CSI-RS resource may be 2, and a number of antenna ports corresponding to a third CSI-RS resource maybe 4. There are two values (2 and 4), so S=2.

In a possible embodiment of the present disclosure, the number of bits for the indication information is $\lceil \log_2(B) \rceil$, where B=unique($\log_2\lceil N_k \rceil$, 1≤k≤K) and B represents a total number of values in numbers of bits corresponding to the numbers of antenna ports corresponding to the resources for transmitting the reference signal, and $N_k$ represents a number of the antenna ports corresponding to the $k^{th}$ resource for transmitting the reference signal.

In a possible embodiment of the present disclosure, the number of bits for the indication information is $\lceil \log_2(P) \rceil$, where P=unique(min{$N_k$,L}, 1≤k≤K) and P represents a total number of values in the numbers of antenna ports corresponding to the resources for transmitting the reference signal and not greater than the maximum number of layers that is supported by the UE, L represents the maximum number of layers that is supported by the UE, and $N_k$ represents a number of the antenna ports corresponding to the $k^{th}$ resource for transmitting the reference signal.

In a possible embodiment of the present disclosure, the number of bits for the indication information is $\lceil \log_2(Y) \rceil$, where Y=unique($\lceil \log_2 \min\{N_k,L\} \rceil$, 1≤k≤K) and Y represents a total number of values in the number of bits corresponding to the numbers of antenna ports corresponding to the resources for transmitting the reference signal and not greater than the maximum number of layers that is supported by the UE, L represents the maximum number of layers that is supported by the UE, and $N_k$ represents a number of the antenna ports corresponding to the $k^{th}$ resource for transmitting the reference signal.

In a possible embodiment of the present disclosure, the transmission module 153 is further configured to: transmit the indication information within a first subframe, and transmit the encoding information within a second subframe subsequent to the first subframe; or transmit the indication information and the encoding information within an identical subframe using an independent encoding mode.

In a possible embodiment of the present disclosure, the transmission module 153 is further configured to: transmit the indication information and the encoding information via a PUCCH; or transmit the indication information and the encoding information via a PUCCH within different subframes respectively; transmit the indication information via the PUCCH, and transmit the encoding information via the PUSCH; or transmit the indication information via the PUSCH, and transmit the encoding information via the PUCCH.

Based on an identical inventive concept, the present disclosure further provides in some embodiments a device for receiving CSI. A principle of the device is similar to that of the method in FIG. 8, so the implementation thereof may refer to that of the method and will not be particularly defined herein.

Figure 16:
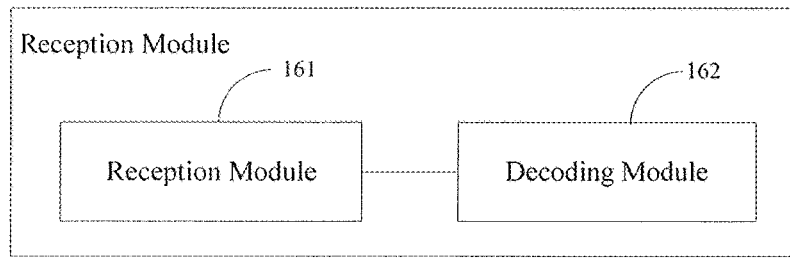
FIG. 16 is a schematic view showing a device for receiving CSI according to one embodiment of the present disclosure.

As shown in FIG. 16, the device includes: a reception module 161 configured to receive indication information indicating a total number of bits for a BI and a RI corresponding to a resource for transmitting a reference signal and encoding information, the BI being configured to indicate an index of the resource for transmitting the reference signal corresponding to the RI measured by a UE; a decoding module 162 configured to perform a joint decoding operation on the encoding information in accordance with the total number of bits indicated in the indication information, to acquire the RI and the BI.

In a possible embodiment of the present disclosure, the reception module 161 is further configured to: receive the indication information within a first subframe, and receive the encoding information within a second subframe subsequent to the first subframe; or receive the indication information and the encoding information within an identical subframe wherein the indication information and the encoding information are encoded using an independent encoding mode.

In a possible embodiment of the present disclosure, the reception module 161 is further configured to: receive the indication information and the encoding information via a PUCCH; or receive the indication information and the encoding information via PUSCHs within different subframes respectively; or receive the indication information via the PUCCH, and receive the encoding information via the PUSCH; or receive the indication information via the PUSCH, and receive the encoding information via the PUCCH.

Based on an identical inventive concept, the present disclosure further provides in some embodiments a device for transmitting CSI. A principle of the device is similar to that of the method in FIG. 9, so the implementation thereof may refer to that of the method and will not be particularly defined herein.

Figure 17:
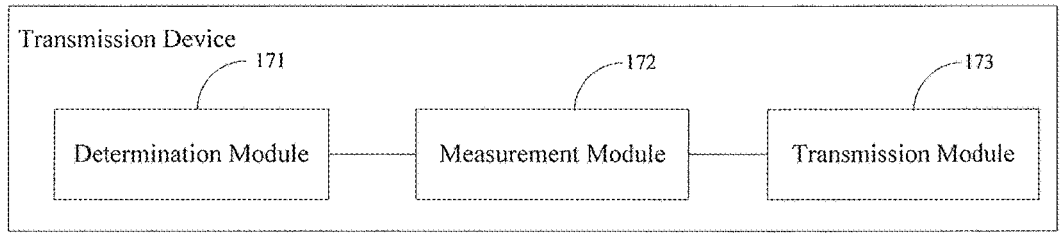
FIG. 17 is a schematic view showing a device for transmitting CSI according to one embodiment of the present disclosure.

As shown in FIG. 17, the device includes: a determination module 171 configured to determine that numbers of antenna ports corresponding to different resources for transmitting a reference signal configured by a base station for a UE in a CSI progress for channel measurement are different; a measurement module 172 configured to perform measurement on a pre-designated resource for transmitting the reference signal; and a transmission module 173 configured to transmit the CSI acquired after the measurement.

In a possible embodiment of the present disclosure, the transmission module 173 is further configured to transmit a BI indicating an index of the resource for transmitting the reference signal measured by the UE.

In a possible embodiment of the present disclosure, the transmission module 173 is further configured to transmit the BI within a first subframe, and transmit the CSI within a second subframe subsequent to the first subframe; or transmit the BI and the CSI within an identical subframe, the BI and the CSI being encoded using an independent encoding mode.

In a possible embodiment of the present disclosure, the transmission module 173 is further configured to: transmit the BI and the CSI via a PUCCH; or transmit the BI and the CSI via PUSCHs within different subframes respectively; or transmit the BI via the PUCCH, and transmit the CSI via the PUSCH; or transmit the CSI via the PUSCH, and transmit the BI via the PUCCH.

Based on an identical inventive concept, the present disclosure further provides in some embodiments a device for receiving CSI. A principle of the device is similar to that of the method in FIG. 10, so the implementation thereof may refer to that of the method and will not be particularly defined herein.

Figure 18:
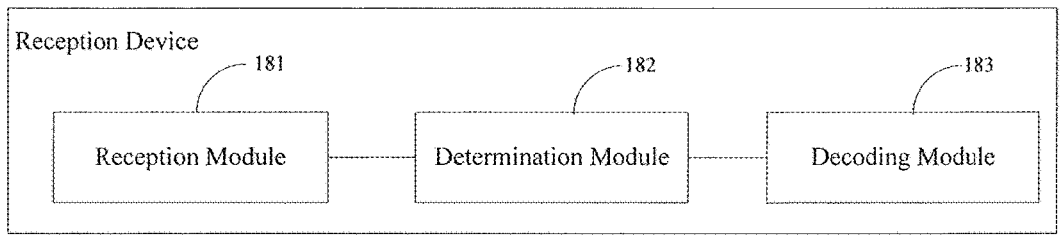
FIG. 18 is a schematic view showing a device for receiving CSI according to one embodiment of the present disclosure.

As shown in FIG. 18, the device includes: a reception module 181 configured to receive the CI from a UE; a determination module 182 configured to determine numbers of antenna ports corresponding to resources for transmitting a reference signal configured by the base station for a UE in a CSI progress for channel measurement; and a decoding module 183 configured to determine a number of bits for a RI corresponding to a pre-designated resource for transmitting the reference signal, and perform a decoding operation on the CSI from the UE in accordance with the number of bits for the RI, to acquire the CSI measured by the UE.

In a possible embodiment of the present disclosure, the reception module 181 is further configured to receive a BI indicating an index of the resource for transmitting the reference signal from the UE.

In a possible embodiment of the present disclosure, the reception module 181 is further configured to: receive the BI within a first subframe, and receive the CSI within a second subframe subsequent to the first substrate; or receive the BI and the CSI within an identical subframe, the BI and the CSI being encoded using an independent encoding mode.

In a possible embodiment of the present disclosure, the reception module 181 is further configured to: receive the BI and the CSI via a PUCCH; or receive the BI and the CSI via PUSCHs within different subframes respectively; or receive the BI via the PUCCH, and receive the CSI via the PUSCH; or receive the CSI via the PUCCH, and receive the BI via the PUSCH.

Based on an identical inventive concept, the present disclosure further provides in some embodiments a device for transmitting CSI. A principle of the device is similar to that of the method in FIG. 11, so the implementation thereof may refer to that of the method and will not be particularly defined herein.

Figure 19:
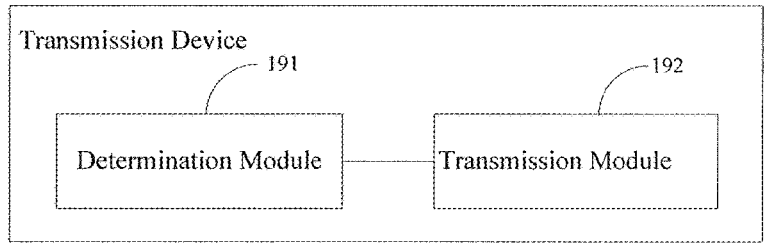
FIG. 19 is a schematic view showing a device for transmitting CSI according to one embodiment of the present disclosure.

As shown in FIG. 19, the device includes: a determination module 191 configured to determine that numbers of antenna ports corresponding to different resources for transmitting a reference signal configured by a base station for a UE in a CSI progress for channel measurement are different; and a transmission module 192 configured to transmit the CSI corresponding to the resources for transmitting the reference signal in accordance with a predetermined reporting sequence.

In a possible embodiment of the present disclosure, the transmission module 192 is further configured to transmit a BI indicating an index of the resource for transmitting the reference signal measured by the UE.

In a possible embodiment of the present disclosure, the transmission module 192 is further configured to: transmit the BI within a first subframe, and transmitting the CSI within a second subframe subsequent to the first subframe; or transmit the BI and the CSI within an identical subframe, the BI and the CSI being encoded using an independent encoding mode.

In a possible embodiment of the present disclosure, the transmission module 192 is further configured to: transmit the BI and the CSI via a PUCCH; or transmit the BI and the CSI via PUSCHs within different subframes respectively; or transmit the BI via the PUCCH, and transmit the CSI via the PUSCH; or transmit the CSI via the PUSCH, and transmit the BI via the PUSCH.

Based on an identical inventive concept, the present disclosure further provides in some embodiments a device for receiving CSI. A principle of the device is similar to that of the method in FIG. 12, so the implementation thereof may refer to that of the method and will not be particularly defined herein.

Figure 20:
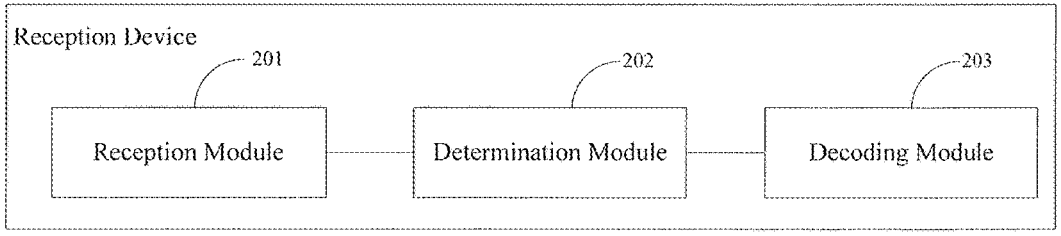
FIG. 20 is a schematic view showing a device for receiving CSI according to one embodiment of the present disclosure.

As shown in FIG. 20, the device includes: a reception module 201 configured to receive the CSI measured by a UE in accordance with resources for transmitting a reference signal; a determination module 202 configured to determine that numbers of antenna ports corresponding to different resources for transmitting a reference signal configured for the UE in a CSI progress for channel measurement are different; and a decoding module 203 configured to determine a number of bits for a RI corresponding to each resource for transmitting the reference signal in accordance with a predetermined reporting sequence, and perform a decoding operation on the CSI corresponding to the resource for transmitting the reference signal in accordance with the number of bits for the RI.

In a possible embodiment of the present disclosure, the reception module 201 is further configured to receive a BI indicating an index of the resource for transmitting the reference signal measured by the UE from the UE.

In a possible embodiment of the present disclosure, the reception module 201 is further configured to receive the BI within a first subframe, and receive the CSI within a second subframe subsequent to the first subframe; or receive the BI and the CSI within an identical subframe, the BI and the CSI being encoded using an independent encoding mode.

In a possible embodiment of the present disclosure, the reception module 201 is further configured to: receive the BI and the CSI via a PUCCH; or receive the BI and the CSI via PUSCHs within different subframes respectively; or receive the BI via the PUCCH, and receive the CSI via the PUSCH; or receive the BI via the PUSCH, and receive the CSI via the PUCCH.

A structure and a processing mode of the device for transmitting the CSI will be described hereinafter by taking the UE as an example in conjunction with a hardware structure.

Figure 21:
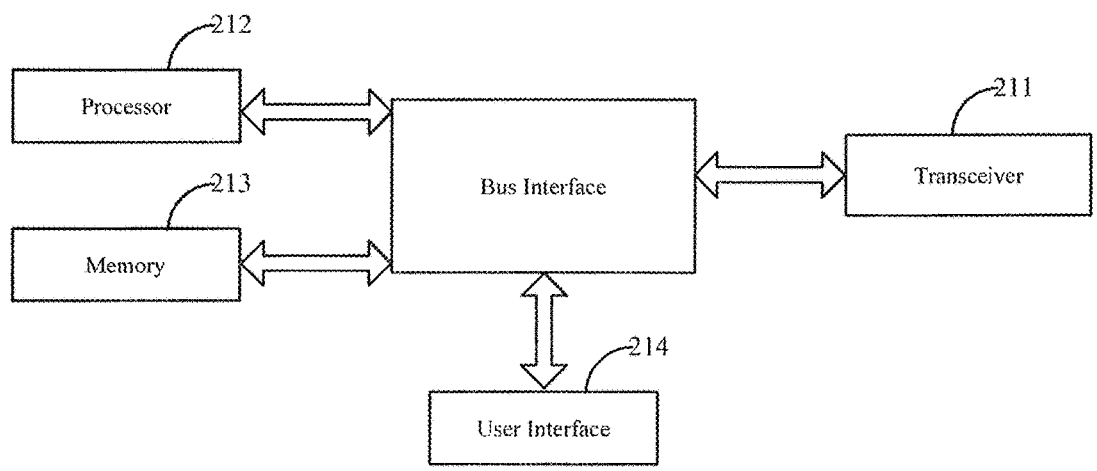
FIG. 21 is a schematic view showing a UE according to one embodiment of the present disclosure.

As shown in FIG. 21, the UE includes a transceiver 211, and at least one processor 212 connected to the transceiver 211.

In a possible embodiment of the present disclosure, the processor 212 is configured to read a program stored in a memory 213 to execute Steps S31 and S32, and the transceiver 211 is configured to receive and transmit data under the control of the processor 212.

In another possible embodiment of the present disclosure, the processor 212 is configured to read the program stored in the memory 213 to execute Steps S61 and S62, and the transceiver 211 is configured to receive and transmit data under the control of the processor 212.

In yet another possible embodiment of the present disclosure, the processor 212 is configured to read the program stored in the memory 213 to execute Steps S91 and S92, and the transceiver 211 is configured to receive and transmit data under the control of the processor 212.

In still yet another possible embodiment of the present disclosure, the processor 212 is configured to read the program stored in the memory 213 to execute Steps S111 and S112, and the transceiver 211 is configured to receive and transmit data under the control of the processor 212.

In FIG. 21, bus architecture may include a number of buses and bridges connected to each other, so as to connect various circuits for one or more processors 212 and one or more memories 213. In addition, as is known in the art, the bus architecture may be used to connect any other circuits, such as a circuit for a peripheral device, a circuit for a voltage stabilizer and a power management circuit, which are not particularly defined herein. Bus interfaces are provided, and the transceiver 211 may consist of one element, or more than one elements, e.g., transmitters and receivers for communication with any other devices over a transmission medium. With respect to different UEs, a user interface 214 may also be provided for devices which are to be arranged inside or outside the UE, and these devices may include but not limited to a keypad, a display, a speaker, a microphone and a joystick. The processor 212 may take charge of managing the bus architecture as well as general processings. The memory 213 may store therein data for the operation of the processor 212.

A structure and a processing mode of the device for receiving the CSI will be described hereinafter by taking the base station as an example in conjunction with a hardware structure.

Figure 22:
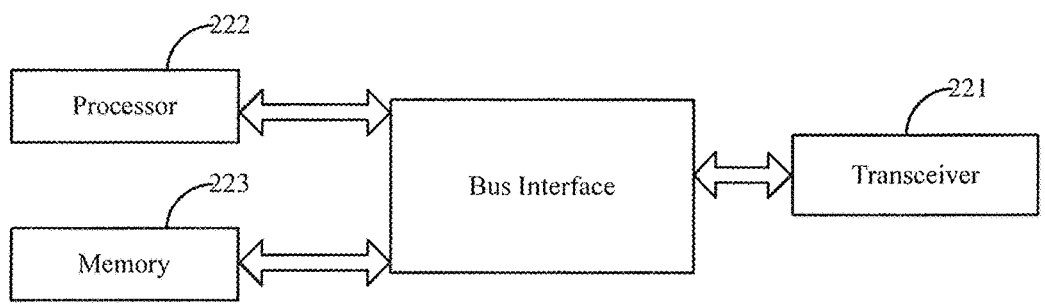
FIG. 22 is a schematic view showing a base station according to one embodiment of the present disclosure.

As shown in FIG. 22, the base station includes a transceiver 221, and at least one processor 222 connected to the transceiver 221.

In a possible embodiment of the present disclosure, the processor 222 is configured to read a program stored in a memory 223 to execute Steps S51 and S52, and the transceiver 221 is configured to receive and transmit data under the control of the processor 222.

In another possible embodiment of the present disclosure, the processor 222 is configured to read the program stored in the memory 223 to execute Steps S81 and S82, and the transceiver 221 is configured to receive and transmit data under the control of the processor 222.

In yet another possible embodiment of the present disclosure, the processor 222 is configured to read the program stored in the memory 223 to execute Steps S101 and S52, and the transceiver 221 is configured to receive and transmit data under the control of the processor 222.

In still yet another possible embodiment of the present disclosure, the processor 222 is configured to read the program stored in the memory 223 to execute Steps S121 and S122, and the transceiver 221 is configured to receive and transmit data under the control of the processor 222.

In FIG. 22, bus architecture may include a number of buses and bridges connected to each other, so as to connect various circuits for one or more processors 222 and one or more memories 223. In addition, as is known in the art, the bus architecture may be used to connect any other circuits, such as a circuit for a peripheral device, a circuit for a voltage stabilizer and a power management circuit, which are not particularly defined herein. Bus interfaces are provided, and the transceiver 221 may consist of one element, or more than one elements, e.g., transmitters and receivers for communication with any other devices over a transmission medium. The processor 222 may take charge of managing the bus architecture as well as general processings. The memory 223 may store therein data for the operation of the processor 222.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory, Compact Disc-Read Only Memory (CD-ROM) and optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A method for transmitting Channel State Information (CSI), comprising steps of:

determining, by a User Equipment (UE), a first number of bits used for a joint encoding operation on a Beam Indicator (BI) and a Rank Indicator (RI), the BI being configured to indicate an index of a resource for transmitting a reference signal corresponding to the RI measured by the UE, an identical first number of bits being used for the joint encoding operation on RI(s)

and the BI corresponding to all resources for transmitting the reference signal; and performing, by the UE, the joint encoding operation on the measured RI and the BI in accordance with the first number of bits to acquire encoding information, and transmitting the encoding information, wherein the step of determining, by the UE, the first number of bits used for the joint encoding operation on the BI and the RI comprises:

determining, by the UE, numbers of bits for the RIs corresponding to all resources for transmitting the reference signal, determining, by the UE, a second number of bits for encoding the RI in accordance with a maximum value of the numbers of bits for the RIs corresponding to all resources for transmitting the reference signal, and determining, by the UE, the first number of bits in accordance with the second number of bits and a number of bits corresponding to the BI; or determining, by the UE, a total number of possible values of the RIs corresponding to all resources for transmitting the reference signal, and determining, by the UE, the first number of bits in accordance with the total number of the possible values of the RIs corresponding to all resources for transmitting the reference signal.

2. The method according to claim 1, wherein the step of determining, by the UE, the number of bits for the RIs corresponding to all resources for transmitting the reference signal comprises:

determining, by the UE, a number of bits for the RI corresponding to each resource for transmitting the reference signal in accordance with a number of antenna ports corresponding to each resource for transmitting the reference signal; or determining, by the UE, a number of bits for the RI corresponding to each resource for transmitting the reference signal in accordance with a minimum value of the number of antenna ports corresponding to each resource for transmitting the reference signal and a maximum number of layers that is supported by the UE.

3. The method according to claim 1, further comprising:

in the case that the UE determines that the number of bits for the measured RI corresponding to the resource for transmitting the reference signal is smaller than the second number of bits, performing, by the UE, a bit padding operation on the RI corresponding to the resource for transmitting the reference signal in accordance with a predetermined bit padding rule; and the step of performing, by the UE, the joint encoding operation on the measured RI and the BI in accordance with the first number of bits comprises performing, by the UE, the joint encoding operation on the RI acquired after the bit padding operation and the BI in accordance with the first number of bits.

4. The method according to claim 1, wherein the step of determining, by the UE, the total number of the possible values of the RIs corresponding to all resources for transmitting the reference signal comprises:

determining, by the UE, a total number of the antenna ports corresponding to all resources for transmitting the reference signal as the total number of the possible values of the RIs corresponding to all resources for transmitting the reference signal; or determining, by the UE, a minimum value of a number of the antenna ports corresponding to each resource for transmitting the reference signal and the maximum number of layers that is supported by the UE, and determining a sum of the minimum values as the total number of the possible values of the RIs corresponding to all resources for transmitting the reference signal.

5. The method according to claim 4, wherein the first number of bits is determined by the UE using the following equation:

$$A = \lceil \log_2(\Sigma_{1 \leq k \leq K} N_k) \rceil, \text{ or}$$

$$A = \lceil \log_2(\Sigma_{1 \leq k \leq K} \min\{L, N_k\}) \rceil,$$

where A represents the first number of bits, $N_k$ represents the number of antenna ports corresponding to a $k^{th}$ resource for transmitting the reference signal, K represents a number of resources for transmitting the reference signal, L represents the maximum layers that is supported by the UE, and $\lceil \; \rceil$ represents a rounding-up operation.

6. A method for receiving Channel State Information (CSI), comprising steps of:

determining, by a base station, a first number of bits used for a joint encoding operation on a Beam Indicator (BI) and a Rank Indicator (RI), the BI being configured to indicate an index of a resource for transmitting a reference signal corresponding to the RI measured by a User Equipment (UE), an identical first number of bits being used for the joint encoding operation on RI(s) and the BI corresponding to all resources for transmitting the reference signal; and performing, by the base station, a joint decoding operation on encoding information from the UE in accordance with the first number of bits, to acquire the RI corresponding to the resource for transmitting the reference signal measured by the UE, wherein the step of determining, by the base station, the first number of bits used for the joint encoding operation on the BI and the RI comprises:

determining, by the base station, numbers of bits for the RIs corresponding to all resources for transmitting the reference signal, determining, by the base station, a second number of bits for encoding the RI in accordance with a maximum value of the numbers of bits for the RIs corresponding to all resources for transmitting the reference signal, and determining, by the base station, the first number of bits in accordance with the second number of bits and a number of bits corresponding to the BI; or determining, by the base station, a total number of possible values of the RIs corresponding to all resources for transmitting the reference signal, and determining, by the base station, the first number of bits in accordance with the total number of the possible values of the RIs corresponding to all resources for transmitting the reference signal.

7. The method according to claim 6, wherein the step of determining, by the base station, the numbers of bits for the RIs corresponding to all resources for transmitting the reference signal comprises:

determining, by the base station, a number of bits for the RI corresponding to each resource for transmitting the reference signal in accordance with a number of antenna ports corresponding to each resource for transmitting the reference signal; or determining, by the base station, a number of bits for the RI corresponding to each resource for transmitting the reference signal in accordance with a minimum value of the number of antenna ports corresponding to each resource for transmitting the reference signal and a maximum number of layers that is supported by the UE.

8. The method according to claim 6, wherein the step of performing, by the base station, the joint decoding operation on the encoding information from the UE in accordance with the first number of bits to acquire the RI corresponding to the resource for transmitting the reference signal comprises:
   performing, by the base station, the joint decoding operation on the encoding information from the UE in accordance with the first number of bits, to acquire the BI and the RI;
   determining, by the base station, that the number of bits for the RI corresponding to the resource for transmitting the reference signal measured by the UE is smaller than the second number of bits, in accordance with the BI; and
   acquiring, by the base station, the RI corresponding to the resource for transmitting the reference signal measured by the UE in accordance with the RI and a predetermined bit padding rule.

9. The method according to claim 6, wherein the step of determining, by the base station, the total number of the possible values of the RIs corresponding to all resources for transmitting the reference signal comprises:
   determining, by the base station, a total number of the antenna ports corresponding to all resources for transmitting the reference signal as the total number of the possible values of the RIs corresponding to all resources for transmitting the reference signal; or
   determining, by the base station, a minimum value of a number of the antenna ports corresponding to each resource for transmitting the reference signal and the maximum number of layers that is supported by the UE, and determining a sum of the minimum values as the total number of the possible values of the RIs corresponding to all resources for transmitting the reference signal.

10. The method according to claim 9, wherein the first number of bits is determined by the base station using the following equation:

$$A = \lceil \log_2(\Sigma_{1 \leq k \leq K} N_k) \rceil, \text{ or}$$

$$A = \lceil \log_2(\Sigma_{1 \leq k \leq K} \min\{L, N_k\}) \rceil,$$

where A represents the first number of bits, $N_k$ represents the number of antenna ports corresponding to a $k^{th}$ resource for transmitting the reference signal, K represents a number of resources for transmitting the reference signal, L represents the maximum layers that is supported by the UE, and $\lceil\ \rceil$ represents a rounding-up operation.

11. A User Equipment (UE), comprising:
   a processor; and
   a memory connected to the processor via a bus interface and configured to store therein programs and data for the operation of the processor, wherein
   the processor is configured to call and execute the programs and data stored in the memory to:
   determine a first number of bits used for a joint encoding operation on a Beam Indicator (BI) and a Rank Indicator (RI), the BI being configured to indicate an index of a resource for transmitting a reference signal corresponding to the RI measured by the UE, an identical first number of bits being used for the joint encoding operation on RI(s) and the BI corresponding to all resources for transmitting the reference signal; and
   perform the joint encoding operation on the RI and the BI in accordance with the first number of bits to acquire encoding information, and transmit the encoding information,
   wherein the processor is further configured to:
   determine numbers of bits for the RIs corresponding to all resources for transmitting the reference signal, determine a second number of bits for encoding the RI in accordance with a maximum value of the numbers of bits for the RIs corresponding to all resources for transmitting the reference signal, and determine the first number of bits in accordance with the second number of bits and a number of bits corresponding to the BI; or
   determine a total number of possible values of the RIs corresponding to all resources for transmitting the reference signal, and determine the first number of bits in accordance with the total number of the possible values of the RIs corresponding to all resources for transmitting the reference signal.

12. The UE according to claim 11, wherein the processor is further configured to:
   determine a number of bits for the RI corresponding to each resource for transmitting the reference signal in accordance with a number of antenna ports corresponding to each resource for transmitting the reference signal; or
   determine a number of bits for the RI corresponding to each resource for transmitting the reference signal in accordance with a minimum value of the number of antenna ports corresponding to each resource for transmitting the reference signal and a maximum number of layers that is supported by the UE.

13. The UE according to claim 11, wherein the processor is further configured to:
   in the case that the UE determines that the number of bits for the measured RI corresponding to the resource for transmitting the reference signal is smaller than the second number of bits, perform a bit padding operation on the RI corresponding to the resource for transmitting the reference signal in accordance with a predetermined bit padding rule; and
   perform the joint encoding operation on the RI acquired after the bit padding operation and the BI in accordance with the first number of bits.

14. The UE according to claim 11, wherein the processor is further configured to:
   determine a total number of the antenna ports corresponding to all resources for transmitting the reference signal as the total number of the possible values of the RIs corresponding to all resources for transmitting the reference signal; or
   determine a minimum value of a number of the antenna ports corresponding to each resource for transmitting the reference signal and the maximum number of layers that is supported by the UE, and determine a sum of the minimum values as the total number of the possible values of the RIs corresponding to all resources for transmitting the reference signal.

15. The UE according to claim 14, wherein the first number of bits is determined by the UE using the following equation:

$$A = \lceil \log_2(\Sigma_{1 \leq k \leq K} N_k) \rceil, \text{ or}$$

$$A = \lceil \log_2(\Sigma_{1 \leq k \leq K} \min\{L, N_k\}) \rceil,$$

where A represents the first number of bits, $N_k$ represents the number of antenna ports corresponding to a $k^{th}$ resource for transmitting the reference signal, K represents a number of resources for transmitting the reference signal, L represents the maximum layers that is supported by the UE, and $\lceil\ \rceil$ represents a rounding-up operation.

16. A network side device, comprising:

a processor; and a memory connected to the processor via a bus interface and configured to store therein programs and data for the operation of the processor, wherein the processor is configured to call and execute the programs and data stored in the memory to:

determine a first number of bits used for a joint encoding operation on a Beam Indicator (BI) and a Rank Indicator (RI), the BI being configured to indicate an index of a resource for transmitting a reference signal corresponding to the RI measured by a User Equipment (UE), an identical first number of bits being used for the joint encoding operation on RI(s) and the BI corresponding to all resources for transmitting the reference signal; and perform a joint decoding operation on encoding information from the UE in accordance with the first number of bits, to acquire the RI corresponding to the resource for transmitting the reference signal measured by the UE, wherein the processor is further configured to:

determine numbers of bits for the RIs corresponding to all resources for transmitting the reference signal, determine a second number of bits for encoding the RI in accordance with a maximum value of the numbers of bits for the RIs corresponding to all resources for transmitting the reference signal, and determine the first number of bits in accordance with the second number of bits and a number of bits corresponding to the BI; or determine a total number of possible values of the RIs corresponding to all resources for transmitting the reference signal, and determine the first number of bits in accordance with the total number of the possible values of the RIs corresponding to all resources for transmitting the reference signal.

17. The network side device according to claim 16, wherein the processor is further configured to:

determine a number of bits for the RI corresponding to each resource for transmitting the reference signal in accordance with a number of antenna ports corresponding to each resource for transmitting the reference signal; or determine a number of bits for the RI corresponding to each resource for transmitting the reference signal in accordance with a minimum value of the number of antenna ports corresponding to each resource for transmitting the reference signal and a maximum number of layers that is supported by the UE.

18. The network side device according to claim 16, wherein the processor is further configured to:

perform the joint decoding operation on the encoding information from the UE in accordance with the first number of bits, to acquire the BI and the RI;

determine that the number of bits for the RI corresponding to the resource for transmitting the reference signal measured by the UE is smaller than the second number of bits, in accordance with the BI; and acquire the RI corresponding to the resource for transmitting the reference signal measured by the UE in accordance with the RI and a predetermined bit padding rule.

19. The network side device according to claim 16, wherein the processor is further configured to:

determine a total number of the antenna ports corresponding to all resources for transmitting the reference signal as the total number of the possible values of the Ms corresponding to all resources for transmitting the reference signal; or determine a minimum value of a number of the antenna ports corresponding to each resource for transmitting the reference signal and the maximum number of layers that is supported by the UE, and determine a sum of the minimum values as the total number of the possible values of the RIs corresponding to all resources for transmitting the reference signal.

20. The network side device according to claim 19, wherein the first number of bits is determined by the base station using the following equation:

$$A = \lceil \log_2(\Sigma_{1 \leq k \leq K} N_k) \rceil, \text{ or}$$

$$A = \lceil \log_2(\Sigma_{1 \leq k \leq K} \min\{L, N_k\}) \rceil,$$

where A represents the first number of bits, $N_k$ represents the number of antenna ports corresponding to a $k^{th}$ resource for transmitting the reference signal, K represents a number of resources for transmitting the reference signal, L represents the maximum layers that is supported by the UE, and $\lceil\ \rceil$ represents a rounding-up operation.

* * * * *